US012798258B2

(12) United States Patent
Koike et al.

(10) Patent No.: US 12,798,258 B2
(45) Date of Patent: Nov. 17, 2026

(54) RECORDING METHOD, RECORDING APPARATUS, AND INK SET

(71) Applicant: SEIKO EPSON CORPORATION, Tokyo (JP)

(72) Inventors: Naoki Koike, Matsumoto (JP); Keigo Ando, Matsumoto (JP); Ippei Okuda, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 130 days.

(21) Appl. No.: 19/068,302

(22) Filed: Mar. 3, 2025

(65) Prior Publication Data

US 2025/0276531 A1 Sep. 4, 2025

(30) Foreign Application Priority Data

Mar. 4, 2024 (JP) ................................ 2024-032017

(51) Int. Cl.
*B41J 2/21* (2006.01)
*C09D 11/326* (2014.01)
*C09D 11/40* (2014.01)

(52) U.S. Cl.
CPC ........... *B41J 2/2114* (2013.01); *C09D 11/326* (2013.01); *C09D 11/40* (2013.01)

(58) Field of Classification Search
CPC ...... B41J 2/2114; C09D 11/326; C09D 11/40; C09D 11/322; C09D 11/38; C09D 11/54
See application file for complete search history.

(56) References Cited

U.S. PATENT DOCUMENTS

2013/0222467 A1* 8/2013 Ooishi .................. C09D 11/40 347/21
2020/0276827 A1 9/2020 Ishida
(Continued)

FOREIGN PATENT DOCUMENTS

JP 2020-138417 A 9/2020

*Primary Examiner* — Jannelle M Lebron
(74) *Attorney, Agent, or Firm* — Harness, Dickey & Pierce, P.L.C.

(57) ABSTRACT

A recording method includes a treatment solution attachment step, in which a treatment solution is attached to a recording medium, a first ink attachment step, in which a first ink composition is ejected and attached to the recording medium, and a second ink attachment step, in which a second ink composition is ejected and attached to the recording medium. The treatment solution is a water-based treatment solution containing at least one coagulant, and the first ink composition and the second ink composition are water-based ink compositions each containing at least one colorant. The treatment solution, the first ink composition, and the second ink composition are attached to the recording medium through a scan in which the relative positions of the ink jet head and the recording medium are moved, the solution and compositions being attached to the same scan area during the same scan. The duration from the landing of the solution droplet of the treatment solution on the recording medium to the landing of the ink droplet of the first ink composition on the recording medium is 0.15 seconds or more and 0.25 seconds or less, and the duration from the landing of the solution droplet of the treatment solution on the recording medium to the landing of the ink droplet of the second ink composition on the recording medium is 0.3 seconds or more and 0.6 seconds or less. The treatment solution contains at least one silicone surfactant, and the silicone surfactant includes a silicone surfactant a, for which the surface tension of a 0.1% by mass aqueous solution of
(Continued)

the surfactant is 28.0 mN/m or less and for which the surface tension of a 0.1% by mass propylene glycol solution of the surfactant is 28.0 mN/m or less.

11 Claims, 11 Drawing Sheets

(56) References Cited

U.S. PATENT DOCUMENTS

| | | | | |
|---|---|---|---|---|
| 2023/0313451 | A1* | 10/2023 | Yamada | D06P 5/08<br>347/21 |
| 2024/0254349 | A1* | 8/2024 | Asakawa | C09D 11/322 |

* cited by examiner

FIG. 8

TABLE 1: (% BY MASS)

| TREATMENT SOLUTION NO. | | R1 | R2 | R3 | R4 | R5 | R6 | R7 | R8 | R9 | R10 | R11 | R12 | R13 | R14 | R15 | R16 |
|---|---|---|---|---|---|---|---|---|---|---|---|---|---|---|---|---|---|
| COAGULANT | CALCIUM FORMATE | 7.0 | 7.0 | 7.0 | 7.0 | 7.0 | - | - | 7.0 | 7.0 | 7.0 | 7.0 | 7.0 | 7.0 | 7.0 | 7.0 | 7.0 |
| | CATIONIC POLYMER | - | - | - | - | - | 4.0 | - | - | - | - | - | - | - | - | - | - |
| | MALONIC ACID | - | - | - | - | - | - | 7.0 | - | - | - | - | - | - | - | - | - |
| SILICONE SURFACTANT(S) | BYK-3420 | 0.8 | - | 1.5 | 0.1 | 0.4 | 0.8 | - | 0.8 | 0.8 | - | - | - | - | - | - | - |
| | BYK-3480 | - | 0.8 | - | - | 0.4 | - | 0.8 | - | - | - | - | - | - | - | - | - |
| | SAG002 | - | - | - | - | - | - | - | - | - | 0.8 | - | - | - | - | - | - |
| | SAG503A | - | - | - | - | - | - | - | - | - | - | 0.8 | - | - | - | - | - |
| | SAG005 | - | - | - | - | - | - | - | - | - | - | - | 0.8 | - | - | - | - |
| | BYK-333 | - | - | - | - | - | - | - | - | - | - | - | - | 0.8 | - | - | - |
| | BYK-348 | - | - | - | - | - | - | - | - | - | - | - | - | - | 0.8 | - | - |
| | BYK-349 | - | - | - | - | - | - | - | - | - | - | - | - | - | - | 0.8 | - |
| | PREPARATION EXAMPLE 1 | - | - | - | - | - | - | - | - | - | - | - | - | - | - | - | 0.8 |
| ORGANIC SOLVENTS | 1,2-HD | 15.0 | 15.0 | 15.0 | 15.0 | 15.0 | 15.0 | 15.0 | 25.0 | 7.5 | 15.0 | 15.0 | 15.0 | 15.0 | 15.0 | 15.0 | 15.0 |
| | PROPYLENE GLYCOL | 15.0 | 15.0 | 15.0 | 15.0 | 15.0 | 15.0 | 15.0 | 15.0 | 7.5 | 15.0 | 15.0 | 15.0 | 15.0 | 15.0 | 15.0 | 15.0 |
| | 2P | - | - | - | - | - | - | - | - | 15.0 | - | - | - | - | - | - | - |
| WATER | PURIFIED WATER | BALANCE | | | | | | | | | | | | | | | |
| TOTAL | | 100 | 100 | 100 | 100 | 100 | 100 | 100 | 100 | 100 | 100 | 100 | 100 | 100 | 100 | 100 | 100 |
| CONDITION (a) SATISFIED? | | Y | Y | Y | Y | Y | Y | Y | Y | Y | N | N | N | N | N | N | Y |

FIG. 9

TABLE 2: (% BY MASS)

| | | FIRST INK | | SECOND INK | |
|---|---|---|---|---|---|
| INK NO. | | C1-1 | C1-2 | C2-1 | C2-2 |
| COLORANT | CARBON BLACK | 3.0 | 3.0 | – | – |
| | CYAN PIGMENT | – | – | 3.0 | 3.0 |
| DISPERSION RESIN | RESIN A | 2.0 | – | 2.0 | – |
| | RESIN B | – | 2.0 | – | 2.0 |
| RESIN PARTICLES | STYRENE-ACRYLIC | 5.0 | 5.0 | 5.0 | 5.0 |
| WAX | POLYETHYLENE WAX | 1.0 | 1.0 | 1.0 | 1.0 |
| SURFACTANT | SILICONE SURFACTANT | 1.0 | 1.0 | 1.0 | 1.0 |
| ORGANIC SOLVENTS | 1,2-HD | 15.0 | 15.0 | 15.0 | 15.0 |
| | PROPYLENE GLYCOL | 10.0 | 10.0 | 10.0 | 10.0 |
| WATER | PURIFIED WATER | BALANCE | | BALANCE | |
| TOTAL | | 100 | 100 | 100 | 100 |
| VISCOSITY INCREASE [-FOLD] WHEN MIXED AT A 10:1 RATIO BY MASS (INK: 7% BY MASS AQUEOUS SOLUTION OF CALCIUM FORMATE) | | 10 | 4 | 10 | 4 |

FIG. 10

TABLE 3:

| | | EXAMPLE 1 | | | EXAMPLE 2 | | | EXAMPLE 3 | | | EXAMPLE 4 | | | EXAMPLE 5 | | |
|---|---|---|---|---|---|---|---|---|---|---|---|---|---|---|---|---|
| TREATMENT SOLUTION, FIRST INK, AND SECOND INK NOS. | | R1 | C1-1 | C2-1 | R2 | C1-1 | C2-1 | R3 | C1-1 | C2-1 | R4 | C1-1 | C2-1 | R5 | C1-1 | C2-1 |
| FORMULA | CONDITION (a) SATISFIED? | Y | - | - | Y | - | - | Y | - | - | Y | - | - | Y | - | - |
| | THICKENING FACTOR [-FOLD] | - | 10 | 10 | - | 10 | 10 | - | 10 | 10 | - | 10 | 10 | - | 10 | 10 |
| | SILICONE SURFACTANT CONTENT [%] | 0.8 | - | - | 0.8 | - | - | 1.5 | - | - | 0.1 | - | - | 0.8 | - | - |
| PRINTING CONDITIONS | TREATMENT SOLUTION-TO-INK TIME LAG [s] | - | 0.2 | 0.45 | - | 0.2 | 0.45 | - | 0.2 | 0.45 | - | 0.2 | 0.45 | - | 0.2 | 0.45 |
| | DROPLET SIZE Iw [ng/dot] | 3 | 6 | 6 | 3 | 6 | 6 | 3 | 6 | 6 | 3 | 6 | 6 | 3 | 6 | 6 |
| | RECORDING MEDIUM SURFACE TEMPERATURE [°C] | 37 | | | 37 | | | 37 | | | 37 | | | 37 | | |
| EVALUATION DETAILS | COVERAGE AND PINHOLES | A | | | A | | | A | | | B | | | A | | |
| | GRAININESS | A | | | A | | | A | | | B | | | A | | |
| | DENSITY UNEVENNESS | A | | | A | | | A | | | A | | | A | | |
| | ABRASION RESISTANCE | A | | | B | | | B | | | A | | | B | | |

| | | EXAMPLE 6 | | | EXAMPLE 7 | | | EXAMPLE 8 | | | EXAMPLE 9 | | | EXAMPLE 10 | | |
|---|---|---|---|---|---|---|---|---|---|---|---|---|---|---|---|---|
| TREATMENT SOLUTION, FIRST INK, AND SECOND INK NOS. | | R6 | C1-1 | C2-1 | R7 | C1-1 | C2-1 | R8 | C1-1 | C2-1 | R9 | C1-1 | C2-1 | R1 | C1-1 | C2-1 |
| FORMULA | CONDITION (a) SATISFIED? | Y | - | - | Y | - | - | Y | - | - | Y | - | - | Y | - | - |
| | THICKENING FACTOR [-FOLD] | - | 10 | 10 | - | 10 | 10 | - | 10 | 10 | - | 10 | 10 | - | 10 | 10 |
| | SILICONE SURFACTANT CONTENT [%] | 0.8 | - | - | 0.8 | - | - | 0.8 | - | - | 0.8 | - | - | 0.8 | - | - |
| PRINTING CONDITIONS | TREATMENT SOLUTION-TO-INK TIME LAG [s] | - | 0.2 | 0.45 | - | 0.2 | 0.45 | - | 0.2 | 0.45 | - | 0.2 | 0.45 | - | 0.2 | 0.45 |
| | DROPLET SIZE Iw [ng/dot] | 3 | 6 | 6 | 3 | 6 | 6 | 3 | 6 | 6 | 3 | 6 | 6 | 3 | 6 | 6 |
| | RECORDING MEDIUM SURFACE TEMPERATURE [°C] | 37 | | | 37 | | | 37 | | | 37 | | | 30 | | |
| EVALUATION DETAILS | COVERAGE AND PINHOLES | B | | | A | | | A | | | A | | | B | | |
| | GRAININESS | B | | | A | | | B | | | B | | | B | | |
| | DENSITY UNEVENNESS | A | | | B | | | A | | | A | | | A | | |
| | ABRASION RESISTANCE | A | | | A | | | B | | | B | | | A | | |

FIG. 11

TABLE 4:

| | | EXAMPLE 11 | | | EXAMPLE 12 | | | EXAMPLE 13 | | | EXAMPLE 14 | | | EXAMPLE 15 | | |
|---|---|---|---|---|---|---|---|---|---|---|---|---|---|---|---|---|
| TREATMENT SOLUTION, FIRST INK, AND SECOND INK NOS. | | R1 | C1-1 | C2-1 | R1 | C1-2 | C2-1 | R1 | C1-1 | C2-2 | R1 | C1-1 | C2-1 | R1 | C1-1 | C2-1 |
| FORMULA | CONDITION (a) SATISFIED? | Y | - | - | Y | - | - | Y | - | - | Y | - | - | Y | - | - |
| | THICKENING FACTOR [-FOLD] | - | 10 | 10 | - | 4 | 10 | - | 10 | 4 | - | 10 | 10 | - | 10 | 10 |
| | SILICONE SURFACTANT CONTENT [%] | 0.8 | - | - | 0.8 | - | - | 0.8 | - | - | 0.8 | - | - | 0.8 | - | - |
| PRINTING CONDITIONS | TREATMENT SOLUTION-TO-INK TIME LAG [s] | - | 0.2 | 0.45 | - | 0.2 | 0.45 | - | 0.2 | 0.45 | - | 0.2 | 0.45 | - | 0.15 | 0.45 |
| | DROPLET SIZE Iw [ng/dot] | 3 | 6 | 6 | 3 | 6 | 6 | 3 | 6 | 6 | 7 | 6 | 6 | 3 | 6 | 6 |
| | RECORDING MEDIUM SURFACE TEMPERATURE [°C] | 50 | | | 37 | | | 37 | | | 37 | | | 37 | | |
| EVALUATION DETAILS | COVERAGE AND PINHOLES | A | | | A | | | A | | | B | | | B | | |
| | GRAININESS | B | | | A | | | A | | | B | | | B | | |
| | DENSITY UNEVENNESS | A | | | B | | | B | | | A | | | A | | |
| | ABRASION RESISTANCE | A | | | A | | | A | | | A | | | A | | |

| | | EXAMPLE 16 | | | EXAMPLE 17 | | |
|---|---|---|---|---|---|---|---|
| TREATMENT SOLUTION, FIRST INK, AND SECOND INK NOS. | | R1 | C1-1 | C2-1 | R16 | C1-1 | C2-1 |
| FORMULA | CONDITION (a) SATISFIED? | Y | - | - | Y | - | - |
| | THICKENING FACTOR [-FOLD] | - | 10 | 10 | - | 10 | 10 |
| | SILICONE SURFACTANT CONTENT [%] | 0.8 | - | - | 0.8 | - | - |
| PRINTING CONDITIONS | TREATMENT SOLUTION-TO-INK TIME LAG [s] | - | 0.2 | 0.6 | - | 0.2 | 0.45 |
| | DROPLET SIZE Iw [ng/dot] | 3 | 6 | 6 | 3 | 6 | 6 |
| | RECORDING MEDIUM SURFACE TEMPERATURE [°C] | 37 | | | 37 | | |
| EVALUATION DETAILS | COVERAGE AND PINHOLES | A | | | A | | |
| | GRAININESS | A | | | A | | |
| | DENSITY UNEVENNESS | B | | | A | | |
| | ABRASION RESISTANCE | A | | | A | | |

FIG. 12

TABLE 5:

| | | COMPARATIVE EXAMPLE 1 | | | COMPARATIVE EXAMPLE 2 | | | COMPARATIVE EXAMPLE 3 | | | COMPARATIVE EXAMPLE 4 | | | COMPARATIVE EXAMPLE 5 | | |
|---|---|---|---|---|---|---|---|---|---|---|---|---|---|---|---|---|
| TREATMENT SOLUTION, FIRST INK, AND SECOND INK NOS. | | R10 | C1-1 | C2-1 | R11 | C1-1 | C2-1 | R12 | C1-1 | C2-1 | R13 | C1-1 | C2-1 | R14 | C1-1 | C2-1 |
| FORMULA | CONDITION (a) SATISFIED? | N | - | - | N | - | - | N | - | - | N | - | - | N | - | - |
| | THICKENING FACTOR [-FOLD] | - | 10 | 10 | - | 10 | 10 | - | 10 | 10 | - | 10 | 10 | - | 10 | 10 |
| | SILICONE SURFACTANT CONTENT [%] | 0.8 | - | - | 0.8 | - | - | 0.8 | - | - | 0.8 | - | - | 0.8 | - | - |
| PRINTING CONDITIONS | TREATMENT SOLUTION-TO-INK TIME LAG [s] | - | 0.2 | 0.45 | - | 0.2 | 0.45 | - | 0.2 | 0.45 | - | 0.2 | 0.45 | - | 0.2 | 0.45 |
| | DROPLET SIZE Iw [ng/dot] | 3 | 6 | 6 | 3 | 6 | 6 | 3 | 6 | 6 | 3 | 6 | 6 | 3 | 6 | 6 |
| | RECORDING MEDIUM SURFACE TEMPERATURE [°C] | 37 | | | 37 | | | 37 | | | 37 | | | 37 | | |
| EVALUATION DETAILS | COVERAGE AND PINHOLES | B | | | B | | | B | | | B | | | B | | |
| | GRAININESS | C | | | C | | | C | | | C | | | C | | |
| | DENSITY UNEVENNESS | A | | | A | | | A | | | A | | | A | | |
| | ABRASION RESISTANCE | A | | | A | | | A | | | A | | | A | | |

| | | COMPARATIVE EXAMPLE 6 | | | COMPARATIVE EXAMPLE 7 | | | COMPARATIVE EXAMPLE 8 | | |
|---|---|---|---|---|---|---|---|---|---|---|
| TREATMENT SOLUTION, FIRST INK, AND SECOND INK NOS. | | R15 | C1-1 | C2-1 | R1 | C1-1 | C2-1 | R1 | C1-1 | C2-1 |
| FORMULA | CONDITION (a) SATISFIED? | N | - | - | Y | - | - | Y | - | - |
| | THICKENING FACTOR [-FOLD] | - | 10 | 10 | - | 10 | 10 | - | 10 | 10 |
| | SILICONE SURFACTANT CONTENT [%] | 0.8 | - | - | 0.8 | - | - | 0.8 | - | - |
| PRINTING CONDITIONS | TREATMENT SOLUTION-TO-INK TIME LAG [s] | - | 0.2 | 0.45 | - | 0.1 | 0.45 | - | 0.2 | 0.65 |
| | DROPLET SIZE Iw [ng/dot] | 3 | 6 | 6 | 3 | 6 | 6 | 3 | 6 | 6 |
| | RECORDING MEDIUM SURFACE TEMPERATURE [°C] | 37 | | | 37 | | | 37 | | |
| EVALUATION DETAILS | COVERAGE AND PINHOLES | B | | | C | | | A | | |
| | GRAININESS | C | | | C | | | A | | |
| | DENSITY UNEVENNESS | A | | | A | | | C | | |
| | ABRASION RESISTANCE | A | | | A | | | A | | |

FIG. 13

TABLE 6:

| SURFACTANT | SAG002 | SAG503A | SAG005 | SAG008 | BYK-333 | BYK-348 | BYK-349 | BYK-3420 | BYK-3480 | PREPARATION EXAMPLE 1 |
|---|---|---|---|---|---|---|---|---|---|---|
| SURFACE TENSION [mN/m] (0.1% AQUEOUS SOLUTION) | 20.61 | 21.6 | 30.3 | 30.76 | 31.64 | 21.62 | 21.89 | 25.99 | 21.39 | 25.4 |
| SURFACE TENSION [mN/m] (0.1% PROPYLENE GLYCOL (PG) SOLUTION) | 36.56 | 36.31 | 22.21 | 22.67 | 22.27 | 34.68 | 33.86 | 27.19 | 24.07 | 26.1 |
| SURFACE TENSION DIFFERENCE (PG SOLUTION − AQUEOUS SOLUTION) | 15.95 | 14.71 | −8.09 | −8.09 | −9.37 | 13.06 | 11.97 | 1.2 | 2.68 | 0.7 |
| GPC WEIGHT-AVERAGE MOLECULAR WEIGHT | – | 1500 | – | – | 4840 | 1540 | 1410 | 1610 | 4230 | 2010 |
| SURFACE TENSIONS MEETING CONDITION (a)? | N | N | N | N | N | N | N | Y | Y | Y |

RECORDING METHOD, RECORDING APPARATUS, AND INK SET

The present application is based on, and claims priority from JP Application Serial Number 2024-032017, filed Mar. 4, 2024, the disclosure of which is hereby incorporated by reference herein in its entirety.

BACKGROUND

1. Technical Field

The present disclosure relates to a recording method, a recording apparatus, and an ink set.

2. Related Art

In the field of ink jet printing on low-absorbency or nonabsorbent media using water-based inks, studies are ongoing to improve image quality (reducing bleed) through early ink fixation using a treatment solution. Such recording methods are being studied in relation to recording apparatuses of line, serial, and other schemes.

For example, in JP-A-2020-138417, there is disclosed a recording method that uses a line-type recording apparatus, which performs recording by once passing multiple line heads relative to a recording medium, each line head having a width greater than or equal to the recording width of the recording medium. The method includes a treatment solution deposition step, in which a treatment solution containing a coagulant is deposited on the recording medium, and an ink deposition step, in which a colored ink composition is ejected from the line heads to deposit it on the recording medium.

When multiple inks are used, this method has faced the disadvantages of inferior graininess and density unevenness in the resulting image when some of the inks land on the recording medium comparatively shortly after the landing of the treatment solution, whereas others land comparatively late.

SUMMARY

A form of a recording method according to the present disclosure includes a treatment solution attachment step, in which a treatment solution is ejected from an ink jet head and attached to a recording medium; a first ink attachment step, in which a first ink composition is ejected from the ink jet head and attached to the recording medium; and a second ink attachment step, in which a second ink composition is ejected from the ink jet head and attached to the recording medium, wherein the treatment solution is a water-based treatment solution containing at least one coagulant; the first ink composition and the second ink composition are water-based ink compositions each containing at least one colorant; the treatment solution, the first ink composition, and the second ink composition are attached to the recording medium through a scan in which relative positions of the ink jet head and the recording medium are moved, the solution and compositions being attached to the same scan area during the same scan; a duration from landing of a solution droplet of the treatment solution on the recording medium to landing of an ink droplet of the first ink composition on the recording medium is 0.15 seconds or more and 0.25 seconds or less; a duration from the landing of the solution droplet of the treatment solution on the recording medium to landing of an ink droplet of the second ink composition on the recording medium is 0.3 seconds or more and 0.6 seconds or less; the treatment solution contains at least one silicone surfactant; the silicone surfactant includes a silicone surfactant a; and the silicone surfactant a is a silicone surfactant for which a surface tension of a 0.1% by mass aqueous solution of the surfactant is 28.0 mN/m or less and for which a surface tension of a 0.1% by mass propylene glycol solution of the surfactant is 28.0 mN/m or less.

A form of a recording apparatus according to the present disclosure is a recording apparatus that performs the above recording method, the recording apparatus including the treatment solution, the first ink composition, and the second ink composition; and an ink jet head that ejects the treatment solution, the first ink composition, and the second ink composition.

A form of an ink set according to the present disclosure is for use in the above recording method, the ink set including the treatment solution, the first ink composition, and the second ink composition.

A form of a treatment solution according to the present disclosure is a treatment solution for use in the above recording method, the treatment solution being a water-based treatment solution containing at least one coagulant and containing at least one silicone surfactant, wherein the silicone surfactant includes a silicone surfactant a; and the silicone surfactant a is a silicone surfactant for which a surface tension of a 0.1% by mass aqueous solution of the surfactant is 28.0 mN/m or less and for which a surface tension of a 0.1% by mass propylene glycol solution of the surfactant is 28.0 mN/m or less.

BRIEF DESCRIPTION OF THE DRAWINGS

FIG. 8 is a table presenting the chemical makeups of the treatment solutions used in the Examples and Comparative Examples (Table 1).

FIG. 9 is a table presenting the chemical makeups of the first and second inks used in the Examples and Comparative Examples (Table 2).

FIG. 10 is a table presenting conditions and evaluation results in the Examples (Table 3).

FIG. 11 is a table presenting conditions and evaluation results in the Examples (Table 4).

FIG. 12 is a table presenting conditions and evaluation results in the Comparative Examples (Table 5).

FIG. 13 is a table presenting characteristic parameters of the surfactants used in the Examples and Comparative Examples (Table 6).

DESCRIPTION OF EMBODIMENTS

Figure 1:
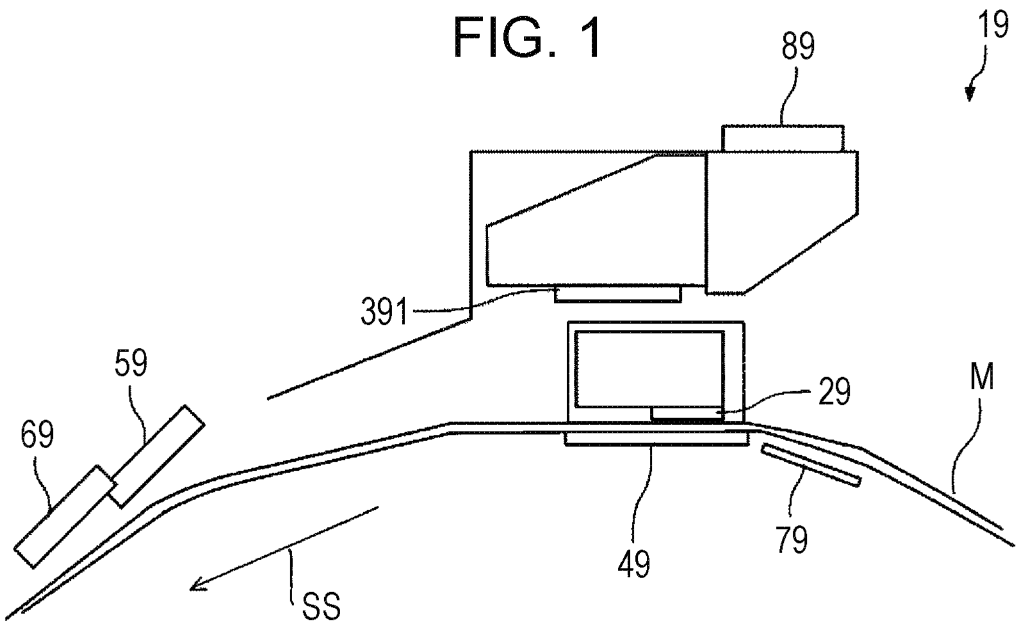
FIG. 1 is an outline cross-sectional view schematically illustrating a serial ink jet recording apparatus.

Embodiments of the present disclosure will now be described. The embodiments described below are descriptions of examples of the present disclosure. The present disclosure is never limited to the following embodiments and includes various variations implemented within the gist of the present disclosure. It should be noted that not all the elements, features, or configurations described below are essential to the present disclosure. In addition, a numerical range expressed using ("from" and) "to" herein indicates a range that includes the values before and after "to" as the lower and upper limits.

1. RECORDING METHOD

A recording method according to this embodiment includes a treatment solution attachment step, in which a treatment solution is ejected from an ink jet head and attached to a recording medium; a first ink attachment step, in which a first ink composition is ejected from the ink jet head and attached to the recording medium; and a second ink attachment step, in which a second ink composition is ejected from the ink jet head and attached to the recording medium.

When the total length in the scanning direction of an ink jet head that a recording apparatus has is long, the duration from the landing of the treatment solution to the landing of the inks can be extended. For example, when an ink jet head with a nozzle row of comparatively long length is used, such an ink jet head may be configured by combining multiple unit heads each having a nozzle row of comparatively short length (unit nozzle rows). Such an ink jet head is an ink jet head having a portion in which unit heads (unit nozzle rows) are positioned differently from each other in the scanning direction.

An example is an ink jet head configured using multiple unit heads arranged in a staggered layout.

Such an ink jet head may be made as an ink jet head having a length equal to or longer than the width of the recording area of the recording medium in the direction perpendicular to the scanning direction (a long head). In such a case, the total length of the ink jet head in the scanning direction is long.

When the number of inks used for recording is comparatively large or when the distance between ink jet heads in the scanning direction is long, too, the total length in the head scanning direction of the ink jet heads that the recording apparatus has is long.

When an ink is ejected from a nozzle row positioned far from the nozzle row that ejects the treatment solution in such a case, the duration from the landing of the treatment solution to the landing of the ink is extended.

An ink ejected from a nozzle row near the nozzle row that ejects the treatment solution, by contrast, lands more shortly after the landing of the treatment solution. During the same scan and within the same scan area, therefore, there is a large difference in the duration from the landing of the treatment solution to the landing of the ink between an ink ejected from nozzles near the treatment solution nozzles and an ink ejected from nozzles far from the treatment solution nozzles. This phenomenon is more likely to occur when the number of inks is large or when the spacing between the nozzle rows is wide. Such a phenomenon, furthermore, can occur in both line and serial recording schemes.

Such time lags have resulted in the disadvantage of inferior characteristics of the resulting image, such as graininess, density unevenness, and coverage. In the recording method according to this embodiment, by contrast, the graininess, density unevenness, and coverage, for example, of the image are superior.

1.1. Treatment Solution Attachment Step

In the treatment solution attachment step, a treatment solution is ejected from an ink jet head and attached to a recording medium.

1.1.1. Recording Medium

The recording medium on which the image is formed in the recording method according to this embodiment may be one having an ink-absorbing recording surface or may be one having no such surface. The recording medium, therefore, is not particularly restricted, and examples include liquid-absorbing recording media, such as paper, films, and fabrics, recording media with low liquid absorbency, such as commercial printing paper, and recording media with no liquid absorbency, such as metals, glass, and polymers. Even with such recording media, on which image graininess is more likely to occur than on others, the recording method according to this embodiment helps further reduce the image graininess.

Recording media with low or no liquid absorbency refer to recording media that absorb little or no ink. Quantitatively, recording media with no or low liquid absorbency refer to "recording media with which, in the Bristow test, water absorption from the start of contact to 30 $msec^{1/2}$ is 10 $mL/m^2$ or less." This Bristow test is the most widely used method for brief measurement of liquid absorption and has also been adopted by the Japan Technical Association of the Pulp and Paper Industry (JAPAN TAPPI). The details of the test method are set out in No. 51 of JAPAN TAPPI Test Method 2000, which specifies the Bristow test as a method for testing liquid absorption in paper and paperboard. Meanwhile, liquid-absorbing recording media refer to recording media that do not fall under the categories of no liquid absorbency and low liquid absorbency. Herein, low liquid absorbency and no liquid absorbency may be referred to simply as low-absorbency and non-absorbent, respectively.

Examples of recording media with no liquid absorbency include those composed of a paper or other substrate with a plastic coating on it, those composed of a paper or other substrate with a plastic film bonded to it, and plastic films without an absorbing (receiving) layer. Examples of plastic materials in this context include polyvinyl chloride, polyethylene terephthalate, polycarbonate, polystyrene, polyurethane, polyethylene, and polypropylene.

Examples of recording media with low liquid absorbency, furthermore, include recording media having a coating layer with low liquid adsorbency on their surface. An example is what is called coated paper. Examples of recording media using a paper substrate, for instance, include commercial printing paper, such as art paper, low coat-weight paper, and matte-coated paper. When the substrate is a plastic film, examples include films of polyvinyl chloride, polyethylene terephthalate, polycarbonate, polystyrene, polyurethane, polyethylene, polypropylene, etc., whose surface has been coated, for example with a polymer, or coated with particles, for example of silica or titanium, together with a binder.

The recording medium can also be a liquid-absorbing recording medium. Liquid-absorbing recording media refer to "recording media with which, in the Bristow test (as described above), water absorption from the start of contact to 30 $msec^{1/2}$ is more than 10 $mL/m^2$."

An example of a liquid-absorbing recording medium is a recording medium rendered absorbent to liquids by a liquid-absorbing receiving layer provided on the surface of the recording medium. An example is ink jet paper (dedicated paper for ink jet recording). An example of a liquid-absorbing receiving layer is a layer formed from a material such as a liquid-absorbing resin or liquid-absorbing inorganic fine particles.

Recording media whose substrate itself is liquid-absorbent are also examples of liquid-absorbing recording media. Examples include fabrics made from fibers and paper containing pulp. Examples types of paper include ordinary printing paper, cardboard, and liner paper. An example of liner paper is one formed from paper such as kraft pulp or wastepaper.

1.1.2. Treatment Solution

The treatment solution used in the recording method according to this embodiment is a water-based treatment solution containing at least one coagulant. The treatment solution according to this embodiment also contains at least one silicone surfactant.

1.1.2.(1) Coagulant

The treatment solution contains at least one coagulant that causes ingredients in the ink compositions to aggregate. The coagulant has the effects of reacting ingredients such as colorants contained in the inks and resin particles that can be contained in the inks and thereby causing the colorants and resin particles to aggregate. The degree of aggregation of the colorants and resin particles caused by the coagulant, however, is adjustable as it varies depending on the specific types of coagulant, colorants, and resin particles. The coagulant, furthermore, can cause colorants and resin particles contained in the inks to aggregate by reacting with the colorants and resin particles. Through such an aggregation process, it is possible to, for example, enhance the color strength of the colorants, enhance the fixation of the resin particles, and/or increase the viscosity of the inks.

The coagulant is not particularly limited, but examples include metal salts, inorganic acids, organic acids, and cationic compounds. Cationic compounds that can be used include cationic resins (cationic polymers) and cationic surfactants. Of these, polyvalent metal salts are particularly preferred as metal salts, and cationic resins are particularly preferred as cationic compounds. It is, therefore, preferred that the coagulant be selected from cationic resins, organic acids, and polyvalent metal salts because in that case the resulting image quality, abrasion resistance, and luster, for example, are superior.

Metal salts other than polyvalent metal salts can also be used, although polyvalent metal salts are preferred as metal salts. Of such coagulants, it is particularly preferred to use at least one selected from metal salts and organic acids because they are superior in reactivity with ingredients contained in the inks. Among cationic compounds, furthermore, it is particularly preferred to use cationic resins because they are highly soluble in the treatment solution. It is also possible to use multiple coagulants in combination.

Polyvalent metal salts are compounds composed of at least one divalent or higher-valency metal ion and an anion. Examples of divalent or higher-valency metal ions include the ions of metals such as calcium, magnesium, copper, nickel, zinc, barium, aluminum, titanium, strontium, chromium, cobalt, and iron. Of such metal ions constituting polyvalent metal salts, it is particularly preferred that the metal ion be at least one of the calcium ion or magnesium ion because these ions are superior in the ability to cause ingredients in the inks to aggregate.

The anion constituting a polyvalent metal salt is an inorganic ion or an organic ion. That is, a polyvalent metal salt as mentioned herein is a salt made up of an inorganic ion or organic ion and at least one polyvalent metal. Examples of such inorganic ions include the chloride ion, iodide ion, nitrate ion, sulfate ion, and hydroxide ion. Examples of organic ions include organic acid ions, an example being the carboxylate ion.

It should be noted that a polyvalent metal compound is preferably an ionic polyvalent metal salt. In particular, when the polyvalent metal salt is a magnesium salt or a calcium salt, the stability of the treatment solution is better. The counterion for the polyvalent metal may be either an inorganic acid ion or an organic acid ion.

Specific examples of such polyvalent metal salts include calcium carbonates, such as heavy calcium carbonate and light calcium carbonate, calcium nitrate, calcium chloride, calcium sulfate, magnesium sulfate, calcium hydroxide, magnesium chloride, magnesium carbonate, barium sulfate, barium chloride, zinc carbonate, zinc sulfide, aluminum silicate, calcium silicate, magnesium silicate, copper nitrate, calcium formate, calcium acetate, magnesium acetate, and aluminum acetate. One such polyvalent metal salt may be used alone, or two or more may be used in combination. Of these, it is particularly preferred to use at least one of calcium formate, magnesium sulfate, calcium nitrate, or calcium chloride, more preferably calcium formate and/or calcium nitrate, because in that case sufficient solubility in water can be ensured, and spot formation by the treatment solution is also reduced (spots become less conspicuous). It should be noted that such metal salts may have water of hydration in their raw material form.

Examples of metal salts other than polyvalent metal salts include salts of monovalent metals, such as sodium salts and potassium salts. Examples include sodium sulfate and potassium sulfate.

Examples of suitable organic acids include poly(meth)acrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyronecarboxylic acid, pyrrolecarboxylic acid, furancarboxylic acid, pyridinecarboxylic acid, coumarinic acid, thiophenecarboxylic acid, nicotinic acid, and derivatives of these compounds and salts thereof. One organic acid may be used alone, or two or more may be used in combination. Salts of organic acids that are metal salts are included in the aforementioned metal salts.

Examples of inorganic acids include sulfuric acid, hydrochloric acid, nitric acid, and phosphoric acid. One inorganic acid may be used alone, or two or more may be used in combination.

Examples of cationic resins (cationic polymers) include cationic urethane resins, cationic olefin resins, and cationic amine resins. A cationic polymer is preferably soluble in water.

A cationic urethane resin can be a commercially available one. For example, resins such as HYDRAN CP-7010, CP-7020, CP-7030, CP-7040, CP-7050, CP-7060, and CP-7610 (trade names; manufactured by Dainippon Ink and Chemicals, Inc.), SUPERFLEX 600, 610, 620, 630, 640, and 650 (trade names; manufactured by DKS Co. Ltd.), and WBR-2120C and WBR-2122C urethane emulsions (trade names; manufactured by Taisei Fine Chemical Co., Ltd.) can be used.

Cationic olefin resins are cationic resins having an olefin, such as ethylene or propylene, in their structural backbone, and known ones can be selected and used as appropriate. Cationic olefin resins may be in an emulsion state in which the resins have been dispersed in solvents including, for example, water and organic solvents. A cationic olefin resin can be a commercially available one, examples of which include ARROWBASE CB-1200 and CD-1200 (trade names; manufactured by Unitika Ltd.).

A cationic amine resin (cationic amine polymer) can be any cationic resin having an amino group in its structure, and known ones can be selected and used as appropriate. Examples include polyamine resins, polyamide resins, and polyallylamine resins. Polyamine resins are resins having an amino group in their polymer backbone. Polyamide resins are resins having an amide group in their polymer backbone. Polyallylamine resins are resins having a structure derived from an allyl group in their polymer backbone.

Examples of cationic polyamine resins, furthermore, include UNISENCE KHE103L (hexamethylenediamine/epichlorohydrin resin; pH of a 1% aqueous solution, approximately 5.0; viscosity, 20 to 50 (mPa·s); an aqueous solution with a solids concentration of 50% by mass) and UNISENCE KHE104L (dimethylamine/epichlorohydrin resin; pH of a 1% aqueous solution, approximately 7.0; viscosity, 1 to 10 (mPa·s); an aqueous solution with a solids concentration of 20% by mass), both manufactured by Senka Corporation. Specific examples of commercially available cationic polyamine resins include FL-14 (manufactured by SNF S.A.), ARAFIX 100, 251S, 255, and 255LOX (manufactured by Arakawa Chemical Industries, Ltd.), DK-6810, 6853, and 6885 and WS-4010, 4011, 4020, 4024, 4027, and 4030 (manufactured by Seiko PMC Corporation), PAPYOGEN P-105 (manufactured by Senka Corporation), Sumirez Resin 650(30), 675A, 6615, and SLX-1 (manufactured by Taoka Chemical Co., Ltd.), Catiomaster® PD-1, 7, 30, A, PDT-2, PE-10, PE-30, DT-EH, EPA-SK01, and TMHMDA-E (manufactured by Yokkaichi Chemical Co., Ltd.), and JETFIX 36N, 38A, and 5052 (manufactured by Satoda Chemical Industrial Co., Ltd.).

Polyallylamine resins are also examples of polyamine resins. Examples of polyallylamine resins include polyallylamine hydrochloride, polyallylamine amidosulfate, allylamine hydrochloride-diallylamine hydrochloride copolymers, allylamine acetate-diallylamine acetate copolymers, allylamine acetate-diallylamine acetate copolymers, allylamine hydrochloride-dimethylallylamine hydrochloride copolymers, allylamine-dimethylallylamine copolymers, polydiallylamine hydrochloride, polymethyldiallylamine hydrochloride, polymethyldiallylamine amidosulfate, polymethyldiallylamine acetate, polydiallyldimethylammonium chloride, diallylamine acetate-sulfur dioxide copolymers, diallylmethylethylammonium ethyl sulfate-sulfur dioxide copolymers, methyldiallylamine hydrochloride-sulfur dioxide copolymers, diallyldimethylammonium chloride-sulfur dioxide copolymers, and diallyldimethylammonium chloride-acrylamide copolymers.

Multiple types of such coagulants may also be used. When at least one type of polyvalent metal salt, organic acid, or cationic resin is selected among such coagulants, a higher-quality image (with good color strength in particular) can be formed by virtue of better coagulating effects than those of others.

The total amount of the coagulant in the treatment solution is, for example, 0.1% by mass or more and 20% by mass or less in relation to the total mass of the treatment solution. Preferably, the total amount is 1% by mass or more and 20% by mass or less, more preferably 2% by mass or more and 15% by mass or less. Even when the coagulant is supplied in solution or dispersion form, it is preferred that the total amount on a solids basis fall within these ranges. When the coagulant content is 1% by mass or more, the ability of the coagulant to cause ingredients in the inks to aggregate is sufficiently strong. With a coagulant content of 30% by mass or less, the solubility and dispersibility of the coagulant in the treatment solution become better, and the storage stability, for example, of the treatment solution can be improved.

The coagulant is preferably one(s) having a solubility limit of 1 g or more, more preferably 3 g or more and 80 g or less, in 100 g of water at 25 °C because this leads to good solubility of the coagulant in the treatment solution even when an organic solvent contained in the treatment solution has high hydrophobicity.

1.1.2.(2) Water

The treatment solution used in the recording method according to this embodiment is a water-based treatment solution, which contains water. A water-based composition is a composition that contains water as one major solvent component. With such a configuration, recording with reduced environmental impacts and less emissions, such as odors, can be performed.

The water may be contained as the primary solvent component of the treatment solution and is an ingredient that evaporates away upon drying. The water is preferably of a type from which ionic impurities have been removed to the lowest possible levels, such as deionized water, ultrafiltered water, reverse osmosis water, distilled water, or any other type of purified or ultrapure water. Using water sterilized by methods such as ultraviolet irradiation or the addition of hydrogen peroxide is advantageous because it helps control mold and bacterial development during extended storage of the treatment solution. The water content is preferably 45% by mass or more in relation to the total amount of the treatment solution. The upper limit is, for example, 99% by mass or less. More preferably, the water content is 50% by mass or more and 98% by mass or less, even more preferably 55% by mass or more and 95% by mass or less.

1.1.2.(3) Silicone Surfactant

The treatment solution used in the recording method according to this embodiment contains at least one silicone surfactant. The silicone surfactant, furthermore, includes a silicone surfactant a, for which the surface tension of a 0.1% aqueous solution of the surfactant is 28.0 mN/m or less and for which the surface tension of a 0.1% propylene glycol solution of the surfactant is 28.0 mN/m or less. "%" represents % by mass.

It should be noted that the condition that the surface tension of a 0.1% aqueous solution of a surfactant is 28.0 mN/m or less and that the surface tension of a 0.1% propylene glycol solution of the surfactant is 28.0 mN/m or less may be herein referred to as "condition (a)." The surface tensions in condition (a), furthermore, are values at 25 °C. The surface tensions can be measured in the same manner as the surface tension of the treatment solution, which will be described later herein.

A silicone surfactant a, which satisfies condition (a), can be identified by preparing a 0.1% aqueous solution and a 0.1% propylene glycol solution of the silicone surfactant, measuring their surface tensions, and checking whether they meet condition (a). Through this, the silicone surfactant a can be prepared.

Examples of silicone surfactants a, for which the surface tension of a 0.1% aqueous solution of the surfactant is 28.0 mN/m or less and for which the surface tension of a 0.1% propylene glycol solution of the surfactant is 28.0 mN/m or less, include BYK-3420 and BYK-3480 (trade names; manufactured by BYK Japan KK).

In the period shortly after the landing of the treatment solution on the recording medium through the treatment solution attachment step, the drying of the treatment solution has not sufficiently progressed, and much water remains. In the period considerably after the landing of the treatment solution, by contrast, the drying of water in the treatment solution has progressed, resulting in a state in which large amounts of organic solvents remain. This is because organic solvents having a normal boiling point higher than that of water are used to impart water retention to the treatment solution. The wettability and spreadability of ink droplets upon contact of the inks with the treatment solution appear to be associated with the surface tension of the treatment solution at the time of contact with the inks.

It appears that the surface tension of a 0.1% aqueous solution of the surfactant is associated with the surface tension of the treatment solution shortly after the landing of the treatment solution, whereas the surface tension of a 0.1% propylene glycol solution of the surfactant is associated with the surface tension of the treatment solution after a certain period following the landing of the treatment solution. The inclusion of a silicone surfactant a, which satisfies condition (a), therefore, ensures that ink droplets coming into contact with the treatment solution at a time shortly after its landing on the recording medium and ink droplets coming into contact with the treatment solution at a time late after its landing have similar levels of wettability and spreadability, thereby allowing superior graininess of the resulting image to be achieved.

It should be noted that when the treatment solution is made without a surfactant satisfying condition (a), ink droplets coming into contact with the treatment solution at a time shortly after its landing and ink droplets coming into contact with the treatment solution at a time late after its landing do not have similar levels of wettability and spreadability. As a result, ink droplets with high wettability and spreadability and ink droplets with low wettability and spreadability coexist in the image, presumably resulting in conspicuous graininess.

Silicone surfactants a, satisfying condition (a), are superior in both surfactant potential in an aqueous solution and surfactant potential in a propylene glycol solution and satisfy condition (a), presumably owing to a good balance between their hydrophilicity and hydrophobicity.

The amount of the silicone surfactant a in the treatment solution is preferably 0.05% by mass or more and 2% by mass or less, more preferably 0.1% by mass or more and 1.5% by mass or less, even more preferably 0.2% by mass or more and 1% by mass or less. Still more preferably, the amount is 0.5% by mass or more and 0.8% by mass or less. When the amount of the silicone surfactant a in the treatment solution falls within such a range, better graininess and coverage pinholes in the resulting image, as well as abrasion resistance, can be achieved.

It is allowed and preferred that the silicone surfactant a be a silicone surfactant represented by formula (1) below. Such a silicone surfactant can be easily made into a silicone surfactant satisfying condition (a). A silicone surfactant represented by general formula (1) has a structure modified at both ends, which means that its hydrophilicity-hydrophobicity balance can be adjusted by varying the length of its siloxane-bonded backbone, excluding the moieties of modifying polyether groups. By virtue of this, the surfactant can be easily tailored to satisfy condition (a).

(1)

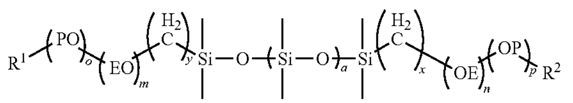

(In the formula, a is an integer of 7 to 50, each of x and y is independently an integer of 1 to 4, each of m and n is independently an integer of 1 to 20, each of o and p is independently an integer of 0 to 20, m+n is from 2 to 40, o+p is from 0 to 40, and $R^1$ and $R^2$ are each independently selected from the group consisting of a hydrogen atom, a hydroxy group, a C1 to C6 alkyl group, and a (meth)acrylic group. E is an ethylene group, and P is a propylene group. The sequence of the OE (EO) unit(s) and the OP (PO) unit(s) is not restricted to the order presented in the formula.)

In formula (1), a, which is an integer of 7 to 50, is preferably from 8 to 48, more preferably from 9 to 45, even more preferably from 10 to 40, still more preferably from 11 to 30, particularly preferably from 11 to 20.

Each of x and y, independently being an integer of 1 to 4, is preferably from 1 to 3, more preferably 2 or 3.

Each of m and n, independently being an integer of 1 to 20, is preferably from 2 to 15, more preferably from 4 to 10, even more preferably from 5 to 8.

Each of o and p, independently being an integer of 0 to 20, is preferably from 0 to 10, more preferably from 0 to 5, even more preferably from 0 to 3, particularly preferably 0 or 1, more particularly preferably 0.

m+n, which is from 2 to 40, is preferably from 4 to 30, more preferably from 8 to 20, even more preferably from 10 to 15.

o+p, which is from 0 to 40, is preferably from 0 to 20, more preferably from 0 to 10, even more preferably from 0 to 3, particularly preferably 0 or 1, more particularly preferably 0.

Each of $R^1$ and $R^2$, independently selected from the group consisting of a hydrogen atom, a hydroxy group, a C1 to C6 alkyl group, and a (meth)acrylic group, is preferably a hydroxy group. The sequence of the OE (EO) unit(s) and the OP (PO) unit(s) is not restricted to the order presented in the formula. That is, when the molecule has one or more OE (EO) units and one or more OP (PO) units, the OE (EO) and OP (PO) units may be arranged in any order.

For P, which is a propylene group, examples include a 1,2-propylene group and a 1,3-propylene group. Preferably, P is a 1,2-propylene group.

It is allowed and preferred that the silicone surfactant a be a silicone surfactant represented by formula (2) below.

(2)

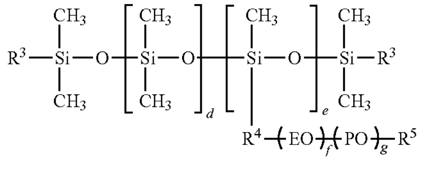

(In the formula, $R^3$ denotes a C1 to C6 alkyl group independently at each occurrence, $R^4$ denotes a C1 to C4 alkylene group, $R^5$ denotes a group selected from the group consisting of a hydrogen atom, a hydroxy group, a C1 to C6 alkyl group, and a (meth)acrylic group, EO denotes an ethylene oxide group, PO denotes a propylene oxide group, the sequence of the EO unit(s) and the PO unit(s) is not restricted to the order presented in the formula, d and e are integers of 1 or greater, d+e represents an integer of 2 to 10, f is an integer of 1 to 20, and g is an integer of 0 to 20.)

In formula (2), d+e, which is an integer of 2 to 10, is preferably from 3 to 8, more preferably from 3 to 6. Each of d and e is preferably half of d+e.

For $R^4$, which is a C1 to C4 alkylene group, the number of carbon atoms is preferably from 1 to 3, more preferably 2 or 3.

f, which is an integer of 1 to 20, is preferably from 2 to 15, more preferably from 4 to 10, even more preferably from 5 to 8.

g, which is an integer of 0 to 20, is preferably from 0 to 10, more preferably from 0 to 5, even more preferably from 0 to 3, particularly preferably 0 or 1, more particularly preferably 0.

$R^5$, which is selected from the group consisting of a hydrogen atom, a hydroxy group, a C1 to C6 alkyl group, and a (meth)acrylic group, is preferably a hydroxy group.

The silicone surfactant a may be obtained through synthesis. For example, it can be synthesized through an addition reaction between a silicone oil having a Si—H structure and a polyether having a carbon-carbon double bond at an end. The synthesis can be achieved using, for example, a Pt catalyst to induce the addition reaction. The silicone oil having a Si—H structure can be a compound like a compound of formula (1) or (2) in which the modifying polyether groups adjacent to the Si atoms bound with the modifying polyether groups have been replaced with hydrogen atoms, and the polyether having a carbon-carbon double bond at an end can be a compound obtained by replacing, in a moiety of a modifying polyether group in formula (1) or (2), the Si atom adjacent to the carbon atom of the modifying polyether group binding to the Si atom with a carbon-carbon double bond.

It is, furthermore, preferred that in the molecular weight distribution of the silicone surfactant a obtained by gel permeation chromatography (GPC), the largest peak at molecular weights of 300 or greater be within the molecular weight range of 1000 to 4500. When the molecular weight of the silicone surfactant a falls within this range, better abrasion resistance of the resulting image can be achieved.

A silicone surfactant having a molecular weight within this range is also preferred because it can be easily made into a surfactant that satisfies the aforementioned condition (a). For example, given that the likelihood of the association and alignment of surfactant molecules in a solution is partly related to the size of the surfactant molecules, silicone surfactants having a molecular weight within the above range are presumably prone to association and alignment equally in both an aqueous solution and a propylene glycol solution, and thus are likely to satisfy condition (a). This, however, is merely a presumption; the reason is not limited to this.

More preferably, the largest peak at molecular weights of 300 or greater in the molecular weight distribution obtained by gel permeation chromatography is within the molecular weight range of 1500 to 4000. Even more preferably, the largest peak is within the molecular weight range of 1550 to 3000, still more preferably within the molecular weight range of 1600 to 2500.

The largest peak at molecular weights of 300 or greater for a silicone surfactant can be identified in a molecular weight distribution chart in GPC obtained with the horizontal axis being "the logarithm of the molecular weight M (Log M)" and the vertical axis being "the derivative of the concentration fraction (dw/d(Log M))." The "largest peak" in this context refers to the highest peak among those occurring at molecular weights of 300 or greater. The "largest peak at molecular weights of 300 or greater," furthermore, means that any peaks at molecular weights below 300 are disregarded. That is, although there may be the largest peak at a molecular weight below 300, the largest peak relevant here is identified by restricting the observation to the range of molecular weights of 300 or more.

The measurement conditions for the GPC measurement in this embodiment can be the conditions specified in the Examples, although not particularly limited. The molecular weight determination can be performed using polystyrene standards.

The treatment solution may further contain silicone surfactants other than the silicone surfactant a, i.e., silicone surfactants that do not satisfy condition (a). Examples of such silicone surfactants include BYK-306, BYK-307, BYK-333, BYK-341, BYK-345, BYK-346, BYK-348, and BYK-349 (trade names; manufactured by BYK Japan KK), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (trade names; manufactured by Shin-Etsu Chemical Co., Ltd.), and SILFACE SAG002, 005, 503A, and 008 (trade names; manufactured by Nissin Chemical Industry Co., Ltd.).

It should be noted that when a silicone surfactant that does not satisfy condition (a) is incorporated in the treatment solution, it is preferred to limit its amount to a level that does not inhibit the action of the silicone surfactant that satisfies condition (a).

1.1.2.(4) Other Ingredients

The treatment solution may contain ingredients such as resin particles, organic solvents, surfactants, wax, excipients, preservatives/antimolds, antirusts, chelating agents, viscosity modifiers, antioxidants, and fungicides, provided that its functions are not impaired. Such ingredients will now be described.

Resin Particles

The treatment solution may contain resin particles. Resin particles can help further improve the adhesion, for example, of the image formed by the inks attached to the recording medium. Examples include particles of resins such as urethane resins, acrylic resins (including styrene-acrylic resins), fluorene resins, polyolefin resins, rosin-modified resins, terpene resins, polyester resins, polyamide resins, epoxy resins, vinyl chloride resins, vinyl chloride-vinyl acetate copolymers, and ethylene vinyl acetate resins. Of these, urethane resins, acrylic resins, polyolefin resins, and polyester resins are particularly preferred. Such resin particles are typically handled in emulsion form, but may be in the physical state of powder. One type of resin particles alone or a combination of two or more types can be used.

The glass transition temperature (Tg) of the resin particles is preferably −50 °C or above and 200 °C or below, more preferably 0 °C or above and 150 °C or below, even more preferably 50 °C or above and 100 °C or below. Particularly preferably, the Tg is 50 °C or above and 80 °C or below. With a glass transition temperature (Tg) of the resin particles falling within these ranges, durability and anti-clogging properties tend to be better. The measurement of the glass transition temperature is performed according to JIS K7121 (Testing Methods for Transition Temperatures of Plastics), for example using "DSC7000" differential scanning colorimeter, manufactured by Hitachi High-Tech Science Corporation.

The volume-average particle diameter of the resin particles is preferably 10 nm or more and 300 nm or less, more preferably 30 nm or more and 300 nm or less, even more preferably 30 nm or more and 250 nm or less, particularly preferably 40 nm or more and 220 nm or less. The volume-average particle diameter can be measured by the method described above.

The resin in the resin particles preferably has an acid value of 50 mg KOH/g or less, more preferably 30 mg KOH/g or less, even more preferably 20 mg KOH/g or less, particularly preferably 10 mg KOH/g or less. The lower limit to the acid value is 0 mg KOH/g or more, preferably 5 mg KOH/g or more, more preferably 10 mg KOH/g or more. These are preferred because in such cases the image quality, for example, is superior. The acid value can be measured by the method described above.

When resin particles are incorporated in the treatment solution, the amount of the resin particles is 0.1% by mass or more and 20% by mass or less, preferably 1% by mass or more and 15% by mass or less, more preferably 2% by mass or more and 10% by mass or less on a solids basis in relation to the total mass of the treatment solution.

Organic Solvents

The treatment solution used in the recording method according to this embodiment may contain one or more organic solvents. Organic solvents having water solubility are preferred. Functions of organic solvents include improving the wettability of the treatment solution on the recording medium and enhancing the moisture retention of the treatment solution. Organic solvents can also function as humectants or penetrants.

Examples of organic solvents include esters, alkylene glycol ethers, cyclic esters, nitrogen-containing solvents, and polyhydric alcohols. Examples of nitrogen-containing solvents include cyclic amides and acyclic amides. Examples of acyclic amides include alkoxyalkylamides.

Examples of esters include glycol monoacetates, such as ethylene glycol monomethyl ether acetate, ethylene glycol monoethyl ether acetate, and ethylene glycol monobutyl ether acetate, and glycol diesters, such as ethylene glycol diacetate, diethylene glycol diacetate, and propylene glycol diacetate.

An alkylene glycol ether can be any monoether or diether of an alkylene glycol, preferably is an alkyl ether. Specific examples include alkylene glycol monoalkyl ethers, such as ethylene glycol monomethyl ether, ethylene glycol monoethyl ether, ethylene glycol monoisopropyl ether, ethylene glycol monobutyl ether, and diethylene glycol monomethyl ether, and alkylene glycol dialkyl ethers, such as ethylene glycol dimethyl ether, ethylene glycol diethyl ether, ethylene glycol dibutyl ether, diethylene glycol dimethyl ether, and diethylene glycol diethyl ether.

Examples of cyclic esters include cyclic esters (lactones) such as β-propiolactone, γ-butyrolactone, δ-valerolactone, ε-caprolactone, and β-butyrolactone and compounds in which one or more hydrogens in the methylene group adjacent to the carbonyl group in such esters have been replaced with C1 to C4 alkyl groups.

Examples of alkoxyalkylamides include 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, and 3-n-butoxy-N,N-methylethylpropionamide.

Examples of cyclic amides include lactams, with examples including pyrrolidones, such as 2-pyrrolidone, 1-methyl-2-pyrrolidone, 1-ethyl-2-pyrrolidone, 1-propyl-2-pyrrolidone, and 1-butyl-2-pyrrolidone. These are preferred because they accelerate the dissolution of the coagulant and the formation of a coating by resin particles, which will be described later herein. In particular, 2-pyrrolidone is more preferred than the others.

It is also preferred to use a compound represented by general formula (1) below as an alkoxyalkylamide.

$$R^1—O—CH_2CH_2—(C{=}O)—NR^2R^3 \quad (1)$$

In formula (1) above, $R^1$ denotes a C1 to C4 alkyl group, and $R^2$ and $R^3$ each independently denote a methyl group or an ethyl group. The "C1 to C4 alkyl group" can be a linear-chain or branched alkyl group. For example, it can be a methyl group, an ethyl group, an n-propyl group, an isopropyl group, an n-butyl group, a sec-butyl group, an isobutyl group, or a tert-butyl group. One compound represented by formula (1) above may be used alone, or two or more may be used as a mixture.

An example of a function of nitrogen-containing solvents is to encourage surface drying and the fixation of the treatment solution attached to a low-absorbency recording medium. In particular, compounds represented by formula (1) above are superior in their ability to soften and dissolve vinyl chloride resins to an appropriate extent. Compounds represented by formula (1) above, therefore, soften and dissolve a recording surface containing a vinyl chloride resin, thereby allowing the treatment solution to penetrate into a low-absorbency recording medium. Such penetration of the treatment solution into a low-absorbency recording medium ensures that the treatment solution is firmly fixed, and also makes the surface of the treatment solution easier to dry. The resulting image, therefore, is likely to be one superior in surface drying and fixation.

When the treatment solution is made with a nitrogen-containing solvent, it is preferred that the solvent be not contained in an amount exceeding 15% by mass in relation to the total mass of the treatment solution. More preferably, the solvent is not contained in an amount exceeding 10% by mass, and even more preferably the solvent is not contained in an amount exceeding 5% by mass. It is, furthermore, preferred that the solvent be not contained in an amount exceeding 2% by mass, and it is more preferred that the solvent be not contained in an amount exceeding 1% by mass.

In particular, it is preferred that the treatment solution be free of amide solvents as mentioned above. With such an arrangement, better graininess and abrasion resistance of the resulting image can be achieved.

Examples of polyhydric alcohols include 1,2-alkanediols (e.g., alkanediols such as ethylene glycol, propylene glycol (also known as propane-1,2-diol), 1,2-butanediol, 1,2-pentanediol, 1,2-hexanediol, 1,2-heptanediol, and 1,2-octanediol) and polyhydric alcohols excluding 1,2-alkanediols (polyols) (e.g., diethylene glycol, dipropylene glycol, 1,3-propanediol, 1,3-butanediol (also known as 1,3-butylene glycol), 1,4-butanediol, 1,5-pentanediol, 1,6-hexanediol, 2-ethyl-2-methyl-1,3-propanediol, 2-methyl-2-propyl-1,3-propanediol, 2-methyl-1,3-propanediol, 2,2-dimethyl-1,3-propanediol, 3-methyl-1,3-butanediol, 2-ethyl-1,3-hexanediol, 3-methyl-1,5-pentanediol, 2-methylpentane-2,4-diol, trimethylolpropane, and glycerol).

Examples of polyhydric alcohols include alkanediols and polyols. An alkanediol is preferably a diol of an alkane with five or more carbons. Preferably, the number of carbons in the alkane is from 5 to 10, more preferably from 5 to 8, even more preferably 5 or 6. Preferred examples include 1,2-alkanediols and propylene glycol. 1,2-Alkanediols are preferred.

Examples of polyols include diols of alkanes with four or fewer carbons, products of intermolecular condensation between hydroxyl groups of alkanediols, and alkanetriols and alkanepolyols containing more hydroxyl groups.

In the foregoing, the number of carbons in the alkane is preferably 2 or 3. The number of hydroxyl groups in the molecule of a polyol is 2 or more, preferably 5 or fewer, more preferably 3 or fewer. When a polyol is a product of intermolecular condensation as mentioned above, the number of molecules condensed is 2 or more, preferably 4 or fewer, more preferably 3 or fewer. One polyhydric alcohol alone or a mixture of two or more can be used.

Alkanediols and polyols can function primarily as penetration solvents and/or moisturizing solvents. Alkanediols, however, tend to have a stronger character as penetration solvents, and polyols tend to have a stronger character as moisturizing solvents.

The treatment solution more preferably contains an organic solvent that is a polyol having a normal boiling point of 170 °C or above and 240 °C or below. With such an arrangement, better graininess and abrasion resistance of the resulting image can be achieved. It is also allowed, and preferred for the same reason, that the treatment solution contain an organic solvent that is a polyhydric alcohol having a normal boiling point of 170 °C or above and 240 °C or below.

When the treatment solution contains an organic solvent, one organic solvent may be used alone, or two or more may be used in combination. The total amount of organic solvents in relation to the total mass of the treatment solution is, for example, 5% by mass or more and 50% by mass or less, preferably 10% by mass or more and 45% by mass or less, more preferably 15% by mass or more and 40% by mass or less, even more preferably 20% by mass or more and 40% by mass or less. Still more preferably, the total amount is from 25% to 35% by mass. With an amount of organic solvents falling within these ranges, the balance between wettability and spreadability and ease of drying is better, facilitating the formation of a higher-quality image.

It is also allowed and preferred to set the amount of organic solvents that are polyols having a normal boiling point of 170 °C or above and 240 °C or below within these ranges. It is also allowed and preferred to set the amount of organic solvents that are polyhydric alcohols having a normal boiling point of 170 °C or above and 240 °C or below within these ranges.

The treatment solution preferably does not contain polyhydric alcohols having a normal boiling point exceeding 280 °C in an amount of 1% by mass or more in relation to the treatment solution. More preferably, the treatment solution does not contain such polyhydric alcohols in an amount of 0.5% by mass or more. It is also allowed and preferred to set the amount of organic solvents, not limited to polyhydric alcohols having a normal boiling point exceeding 280 °C, within these ranges.

Surfactants

The treatment solution may contain one or more surfactants other than silicone surfactants. Surfactants have a function of adjusting the surface tension of the treatment solution, thereby adjusting, for example, its wettability on the recording medium. Of surfactants, acetylene glycol surfactants and fluorosurfactants, for example, are particularly preferred for use.

It should be noted that when a surfactant other than the silicone surfactant a is incorporated, it is preferred to limit its amount to a level that does not inhibit the action of the silicone surfactant that satisfies condition (a).

Examples of acetylene glycol surfactants include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, and DF110D (all are trade names; manufactured by Air Products and Chemicals, Inc.), OLFINE B, Y, P, A, STG, SPC, E1004, E1010, PD-001, PD-002W, PD-003, PD-004, EXP.4001, EXP.4036, EXP.4051, AF-103, AF-104, AK-02, SK-14, and AE-3 (all are trade names; manufactured by Nissin Chemical Industry Co., Ltd.), and ACETYLENOL E00, E00P, E40, and E100 (all are trade names; manufactured by Kawaken Fine Chemicals Co., Ltd.), although not particularly limited.

A fluorosurfactant is preferably a fluorine-modified polymer. Specific examples include BYK-3440 (manufactured by BYK Japan KK), SURFLON S-241, S-242, and S-243 (trade names; manufactured by AGC Seimi Chemical Co., Ltd.), and FTERGENT 215M (manufactured by Neos Corporation).

Wax

The treatment solution may contain wax. Wax has a function of imparting lubricity to ink images. With wax, therefore, it may be possible to reduce defects such as image detachment.

The constituent(s) of the wax can be one or a mixture of multiple types of substances including vegetable/animal waxes, such as carnauba wax, candelilla wax, beeswax, rice bran wax, and lanolin; petroleum waxes, such as paraffin wax, microcrystalline wax, polyethylene wax, oxidized polyethylene wax, and petrolatum; mineral waxes, such as montan wax and ozokerite; and synthetic waxes, such as carbon wax, hoechst wax, polyolefin wax, and stearic acid amide, natural/synthetic wax emulsions, such as α-olefin-maleic anhydride copolymers, and compound waxes. Of these, it is particularly preferred to use polyolefin wax (polyethylene wax or polypropylene wax in particular) and paraffin wax because they are better in their effect of enhancing fixation on flexible packaging films, which will be described later herein.

The wax can be a commercially available product used as is. Examples include NOPCOTE PEM-17 (trade name; manufactured by San Nopco Ltd.), CHEMIPEARL W4005 (trade name; manufactured by Mitsui Chemicals, Inc.), and AQUACER 515, 539, and 593 (trade names; manufactured by BYK Japan KK).

From the viewpoint of preventing a reduction in wax performance that occurs due to excessive melting when the recording method includes, for example, a heating step, it is preferred that the melting point of the wax be 50 °C or above and 200 °C or below. It is more preferred to use a wax having a melting point of 70 °C or above and 180 °C or below, even more preferably a wax having a melting point of 90 °C or above and 150 °C or below.

The wax may be supplied in the form of an emulsion or suspension. The amount of the wax is 0.1% by mass or more and 10% by mass or less, more preferably 0.5% by mass or more and 5% by mass or less, even more preferably 0.5% by mass or more and 2% by mass or less on a solids basis in relation to the total mass of the treatment solution. When the amount of the wax is within these ranges, the wax can serve its function well. It should be noted that when at least one of the treatment solution or the clear ink composition, the first ink composition, or the second ink composition, described later herein, contains wax, its function of imparting lubricity to the image can be more sufficiently produced.

Excipients

The treatment solution may contain, for example, ureas, amines, or saccharides as excipients. Examples of ureas include compounds such as urea, ethylene urea, tetramethylurea, thiourea, and 1,3-dimethyl-2-imidazolidinone, as well as betaines (e.g., trimethylglycine, triethylglycine, tripropylglycine, triisopropylglycine, N,N,N-trimethylalanine, N,N,N-triethylalanine, N,N,N-triisopropylalanine, N,N,N-trimethylmethylalanine, carnitine, and acetylcarnitine).

Examples of amines include diethanolamine, triethanolamine, and triisopropanolamine. Ureas and amines may be allowed to function as pH-adjusting agents.

Examples of saccharides include glucose, mannose, fructose, ribose, xylose, arabinose, galactose, aldonic acid, glucitol (sorbitol), maltose, cellobiose, lactose, sucrose, trehalose, and maltotriose.

Others

Optionally, the treatment solution used in the recording method according to this embodiment may further contain ingredients such as preservatives/antimolds, antirusts, chelating agents, viscosity modifiers, antioxidants, and fungicides.

1.1.2.(5) Characteristics of the Treatment Solution

The treatment solution used in the recording method according to this embodiment preferably has a surface tension at 25 °C of 40 mN/m or less, preferably 38 mN/m or less, more preferably 35 mN/m or less, even more preferably 30 mN/m or less to ensure that its wettability and spreadability on the recording medium are appropriate. The measurement of the surface tension can be performed by wetting a platinum plate with the treatment solution in a 25 °C environment and checking the surface tension using CBVP-Z automated surface tensiometer (manufactured by Kyowa Interface Science Co., Ltd.).

The treatment solution is more preferably attached to the recording medium by ink jet technology. In that case, it is preferred to ensure that its viscosity at 20 °C is 1.5 mPa·s or more and 15 mPa·s or less, more preferably 1.5 mPa·s or more and 7 mPa·s or less, more preferably 1.5 mPa·s or more and 5.5 mPa·s or less. When the treatment solution is attached to the recording medium by ink jet technology, it is easier to efficiently form a predetermined treatment solution-coated area on the recording medium.

1.1.3. Method for Attaching the Treatment Solution to the Recording Medium

The treatment solution attachment step is performed through an attachment step in which the treatment solution is ejected from an ink jet head and attached to a recording medium, and may be conducted in any scheme, provided that it is in a manner in which the treatment solution is attached while a scan that is a movement of the relative positions of the ink jet head and the recording medium is made. Examples of ink jet schemes include the serial scheme and the line scheme. With such a configuration, high-mix low-volume printing can be efficiently performed with small equipment.

The attachment density of the treatment solution in the treatment solution attachment step is preferably 0.4 mg/inch$^2$ or more. The attachment density, furthermore, is preferably 0.5 mg/inch$^2$ or more, and it is preferred that the attachment density be 1.0 mg/inch$^2$ or more. It is more preferred that the attachment density be 1.5 mg/inch$^2$ or more, even more preferably 2.0 mg/inch$^2$ or more. With such an arrangement, an image with even better coverage can be obtained.

For the upper limit to the attachment density of the treatment solution in the treatment solution attachment step, it is likely that graininess emerges on the image when the attachment density is 5.0 mg/inch$^2$ or less, 3.0 mg/inch$^2$ or less, or even 2.5 mg/inch$^2$ or less. Even in that case, however, an advantage of the recording method according to this embodiment, i.e., the possibility of reducing graininess, is more significantly produced. It is also allowed and preferred to set the maximum attachment density of the treatment solution in the treatment solution attachment step within these ranges.

The mass (ng) of the droplets of the treatment solution in the treatment solution attachment step is preferably 0.5 ng or more and 10 ng or less, more preferably 1 ng or more and 7 ng or less, even more preferably 1 ng or more and 5 ng or less, still more preferably 2 ng or more and 4 ng or less. When expressed as a dot size (ng/dot), the mass (ng) of the droplets of the treatment solution in the treatment solution attachment step is preferably 0.5 ng/dot or more and 10 ng/dot or less, more preferably 1 ng/dot or more and 7 ng/dot or less, even more preferably 1 ng/dot or more and 5 ng/dot or less, still more preferably 2 ng/dot or more and 4 ng/dot or less.

After the treatment solution is attached to the recording medium through the treatment solution attachment step, the attachment of inks to the recording medium through the ink attachment steps is performed. In the treatment solution attachment step, the treatment solution is attached during the same scan as the scan (pass) in which the first ink composition and/or the second ink composition is attached to the recording medium, to the same scan area as the ink composition(s). A manner in which the treatment solution, the first ink composition, and the second ink composition are attached to the recording medium during "one pass" in the recording apparatus, which will be described later herein, is also included.

The treatment solution attachment step is performed such that the ink compositions that have adhered to the recording medium through the ink attachment steps and the treatment solution that has adhered to the recording medium through the treatment solution attachment step can come into contact and react on the recording medium.

1.2. First Ink Attachment Step

The first ink attachment step is a step in which a first ink composition, which is a water-based ink composition containing at least one colorant, is attached to the recording medium. The technique for the attachment to the recording medium and other details will be described later herein.

1.2.1. First Ink Composition

The first ink composition is a water-based ink composition containing at least one colorant.

1.2.1.(1) Colorant

The first ink composition is an ink containing at least one colorant. Examples of colorants include dyes and pigments. The colorant can be, for example, a colorant of the color of cyan, yellow, magenta, black, etc., or a white colorant. Alternatively, the first ink composition may be a spot color ink, such as red, orange, blue, or green, or a light ink, such as light magenta, light cyan, or gray.

The colorant may be either a dye or a pigment, and may even be a mixture. Of dyes and pigments, however, it is markedly preferred that at least one pigment be contained. Pigments are superior in storage stability, such as light fastness, weatherability, and resistance to gases, and organic pigments are preferred in light of such characteristics.

Specifically, pigments that can be used include azo pigments, such as insoluble azo pigments, condensed azo pigments, azo lakes, and chelate azo pigments, polycyclic pigments, such as phthalocyanine pigments, perylene and perinone pigments, anthraquinone pigments, quinacridone pigments, dioxane pigments, thioindigo pigments, isoindolinone pigments, and quinophthalone pigments, dye chelates, dye lakes, nitro pigments, nitroso pigments, aniline black, daylight fluorescent pigments, and carbon black. One such pigment can be used alone, or two or more can be used in combination. Glitter pigments, furthermore, may also be used as colorants.

Specific examples of pigments include the following, although not particularly limited.

Examples of black pigments include products such as No. 2300, No. 900, MCF88, No. 33, No. 40, No. 45, No. 52, MA7, MA8, MA100, and No. 2200B (manufactured by Mitsubishi Chemical Corporation), products such as Raven 5750, Raven 5250, Raven 5000, Raven 3500, Raven 1255, and Raven 700 (manufactured by Columbian Carbon Company), products such as Regal 400R, Regal 330R, Regal 660R, Mogul L, Monarch 700, Monarch 800, Monarch 880, Monarch 900, Monarch 1000, Monarch 1100, Monarch 1300, and Monarch 1400 (manufactured by CABOT JAPAN K.K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (manufactured by Degussa AG).

Examples of yellow pigments include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of magenta pigments include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245 or C.I. Pigment Violet 19, 23, 32, 33, 36, 38, 43, and 50.

Examples of cyan pigments include C.I. Pigment Blue 1, 2, 3, 15, 15:1, 15:2, 15:3, 15:34, 15:4, 16, 18, 22, 25, 60, 65, and 66 and C.I. Vat Blue 4 and 60.

Examples of pigments other than magenta, cyan, and yellow include C.I. Pigment Green 7 and 10, C.I. Pigment Brown 3, 5, 25, and 26, and C.I. Pigment Orange 1, 2, 5, 7, 13, 14, 15, 16, 24, 34, 36, 38, 40, 43, and 63, although not particularly limited.

Examples of pearl pigments include pigments having pearly luster or interference luster, such as titanium dioxide-coated mica, pearl essence, and bismuth oxychloride, although not particularly limited.

Examples of metallic pigments include particles of pure metals, such as aluminum, silver, gold, platinum, nickel, chromium, tin, zinc, indium, titanium, and copper, or alloys thereof.

Examples of white colorants include metal compounds, such as metal oxides, barium sulfate, and calcium carbonate. Examples of metal oxides include titanium dioxide, zinc oxide, silica, alumina, and magnesium oxide. Particles having a hollow structure may also be used as a white colorant, and the particles having a hollow structure can be of a known type. Of the examples of white colorants listed, it is particularly preferred to use titanium dioxide because it has good whiteness and abrasion resistance.

As for dyes, examples of those that can be used include dyes commonly used in ink jet recording, such as direct dyes, acid dyes, food dyes, basic dyes, reactive dyes, disperse dyes, vat dyes, soluble vat dyes, and reactive disperse dyes.

It is preferred that the colorant be stably dispersible or soluble in a dispersion medium. The colorant may optionally be dispersed using at least one dispersant.

It is preferred that the colorant be stably dispersible in a dispersion medium. To achieve this, the colorant may be dispersed using at least one dispersant. The dispersant can be, for example, a resin dispersant and is selected from types with which good dispersion stability of the colorant in the first ink composition can be achieved. The colorant, furthermore, may be used as a self-dispersible pigment by modifying the surface of pigment particles through pigment surface oxidation or sulfonation, for example with ozone, hypochlorous acid, or fuming sulfuric acid.

Examples of resin dispersants (dispersant resins) include water-soluble resins, such as (meth)acrylic resins and salts thereof, including poly(meth)acrylic acid, (meth)acrylic acid-acrylonitrile copolymers, (meth)acrylic acid-(meth) acrylate copolymers, vinyl acetate-(meth)acrylate copolymers, vinyl acetate-(meth)acrylic acid copolymers, and vinyl naphthalene-(meth)acrylic acid copolymers; styrene resins and salts thereof, including styrene-(meth)acrylic acid copolymers, styrene-(meth)acrylic acid-(meth)acrylate copolymers, styrene-α-methylstyrene-(meth)acrylic acid copolymers, styrene-α-methylstyrene-(meth)acrylic acid-(meth)acrylate copolymers, styrene-maleic acid copolymers, and styrene-maleic anhydride copolymers; urethane resins and salts thereof, the urethane resins being polymeric compounds (resins) containing a urethane linkage, which results from the reaction between an isocyanate group and a hydroxyl group, and possibly being linear-chain and/or branched, with or without a crosslink structure; polyvinyl alcohols; vinyl naphthalene-maleic acid copolymers and salts thereof; vinyl acetate-maleate copolymers and salts thereof; and vinyl acetate-crotonic acid copolymers and salts thereof. Of these, copolymers of monomers having a hydrophobic functional group and monomers having a hydrophilic functional group and polymers made up of monomers having both hydrophobic and hydrophilic functional groups are particularly preferred. The form of a copolymer can be any of a random copolymer, a block copolymer, an alternating copolymer, or a graft copolymer. Styrene resins that are copolymers of styrene and (meth)acrylic monomers are also (meth)acrylic resins.

Examples of commercially available styrene resin dispersants include X-200, X-1, X-205, X-220, and X-228 (manufactured by Seiko PMC Corporation), SN-DISPERSANT® 6100 and 6110 (manufactured by San Nopco Ltd.), Joncryl 67, 586, 611, 678, 680, 682, and 819 (manufactured by BASF SE), DISPERBYK-190 (manufactured by BYK Japan KK), and N-EA137, N-EA157, N-EA167, N-EA177, N-EA197D, N-EA207D, and E-EN10 (manufactured by DKS Co., Ltd.).

Examples of commercially available acrylic resin dispersants, furthermore, include BYK-187, BYK-190, BYK-191, BYK-194N, and BYK-199 (manufactured by BYK Japan KK) and Aron A-210, A6114, AS-1100, AS-1800, A-30SL, A-7250, and CL-2 (manufactured by Toagosei Co., Ltd.).

Moreover, examples of commercially available urethane resin dispersants include BYK-182, BYK-183, BYK-184, and BYK-185 (manufactured by BYK Japan KK), TEGO Disperse 710 (manufactured by Evonik Tego Chemie GmbH), and Borchi® Gen 1350 (manufactured by OMG Borchers GmbH).

One dispersant may be used alone, or two or more may be used in combination. The total amount of dispersants is preferably 0.1 parts by mass or more and 30 parts by mass or less, more preferably 0.5 parts by mass or more and 25 parts by mass or less, even more preferably 1 part by mass or more and 20 parts by mass or less, still more preferably 1.5 parts by mass or more and 15 parts by mass or less in relation to 50 parts by mass of the white colorant. With an amount of dispersants of 0.1 parts by mass or more in relation to 50 parts by mass of the colorant, the dispersion stability of the colorant can be further increased. When the amount of dispersants is 30 parts by mass or less in relation to 50 parts by mass of the colorant, the viscosity of the resulting dispersion can be kept low.

Of the examples of dispersants listed above, it is particularly preferred that the dispersant be at least one selected from anionic dispersant resins. In that case, it is more preferred that the weight-average molecular weight of the dispersant be 500 or greater. The weight-average molecular weight is preferably 5000 or greater and 100000 or less, more preferably 10000 or greater and 50000 or less.

When such a resin dispersant is used as a dispersant, the dispersion and aggregability of the pigment become even better, allowing an image with even better dispersion stability and even better quality to be obtained. It is also preferred because in that case it is easier to make the thickening factor of the first ink composition, which will be described later herein, 5 or greater.

Anionic dispersant resins are resins that have an anionic functional group and exhibit an anionic character. Examples of anionic functional groups include a carboxyl group, a sulfo group, and a phosphoric acid group. Of these groups, a carboxyl group, in particular, is more preferred than the others.

The dispersant resin preferably has an acid value. It is preferred that the acid value be 5 mg KOH/g or more, more preferably from 10 to 200 mg KOH/g, even more preferably from 15 to 150 mg KOH/g. It is, furthermore, preferred that the acid value be from 20 to 100 mg KOH/g, more preferably from 30 to 80 mg KOH/g. The lower limit is preferably 40 mg KOH/g or more, more preferably 50 mg KOH/g or more, particularly preferably 60 mg KOH/g or more, more particularly preferably 70 mg KOH/g or more. These are preferred because in these cases it is easier to make the thickening factor of the first ink composition, which will be described later herein, 5 or greater.

The acid value can be measured by neutralization potentiometric titration according to JIS K0070. The titrator can be, for example, "AT610," manufactured by Kyoto Electronics Manufacturing Co., Ltd.

The amount of the colorant is preferably 0.3% by mass or more and 20% by mass or less, more preferably 0.5% by mass or more and 15% by mass or less, in relation to the total mass of the first ink composition. The amount of the colorant, furthermore, is preferably 1% by mass or more and 10% by mass or less, more preferably 2% by mass or more and 7% by mass or less.

When a pigment is employed as a colorant, it is preferred that the volume-average particle diameter of the pigment particles be 10 nm or more and 300 nm or less, more preferably 30 nm or more and 250 nm or less, even more preferably 50 nm or more and 250 nm or less, particularly preferably 70 nm or more and 200 nm or less. The volume-average particle diameter, furthermore, is preferably 80 nm or more and 150 nm or less. The volume-average particle diameter of the colorant is that measured as an initial-state value using the above-described method for checking the volume-average particle diameter. A volume-average particle diameter falling within these ranges is preferred because in that case it is easier to obtain the desired colorant and it is easier to achieve, for example, good characteristics of the colorant.

1.2.1.(2) Water

The first ink composition used in the recording method according to this embodiment is a water-based ink, which contains water. A water-based composition is a composition that contains water as one major solvent component. With such a configuration, recording with reduced environmental impacts and less emissions, such as odors, can be performed. The description of the water is omitted; the water and its amount can be the same as in the treatment solution described above.

1.2.1.(3) Other Ingredients

In addition to the colorant and water, the first ink composition may contain ingredients such as resin particles, organic solvents, surfactants, wax, excipients, preservatives/antimolds, antirusts, chelating agents, viscosity modifiers, antioxidants, and fungicides.

The ingredients in the first ink composition are similar to those that may be used in the treatment solution, excluding the colorant and the coagulant, and can be selected independently of those in the treatment solution. All of these ingredients can be the same as in the treatment solution described above, and their detailed description is omitted by substituting "treatment solution" with "first ink composition."

It should be noted that when a surfactant is mixed in the first ink composition, the surfactants that can be used are the same as in the treatment solution described above. The surfactant can be selected irrespective of whether it satisfies condition (a) or not.

1.2.1.(4) Characteristics of the First Ink Composition

The first ink composition used in the recording method according to this embodiment preferably has a surface tension at 25 °C of 40 mN/m or less, preferably 38 mN/m or less, more preferably 35 mN/m or less, even more preferably 30 mN/m or less to ensure that its wettability and spreadability on the recording medium are appropriate. The measurement of the surface tension can be performed by wetting a platinum plate with the composition in a 25 °C environment and checking the surface tension using CBVP-Z automated surface tensiometer (manufactured by Kyowa Interface Science Co., Ltd.).

The first ink composition is attached to the recording medium by ink jet technology. It is, therefore, preferred to ensure that its viscosity at 20 °C is 1.5 mPa·s or more and 15 mPa·s or less, more preferably 1.5 mPa·s or more and 7 mPa·s or less, more preferably 1.5 mPa·s or more and 5.5 mPa·s or less.

1.2.2. Thickening Factor of the First Ink Composition

For the first ink composition, it is preferred that the viscosity increase when mixed with a 7% by mass aqueous solution of calcium formate at a ratio by mass (first ink composition:7% by mass aqueous solution of calcium formate) of 10:1 be fivefold or greater. With the first ink composition having such thickening properties, the aggregation of its ingredients upon contact with the treatment solution is sufficient, and better quality of the image formed by the first ink composition can be achieved. With such an arrangement, better density unevenness in the image can be achieved.

For the thickening factor of the first ink composition, the "thickening factor" is defined as follows in relation to the increase in the viscosity of the ink when mixed with a 7% by mass aqueous solution of calcium formate. That is, the ink and the treatment solution used in the recording method are employed, and they are mixed at a ratio by mass of 10:1 (ink:treatment solution) and stirred. The thickening factor is defined as the ratio of the viscosity of the resulting mixture to the viscosity of the ink alone (the factor by which viscosity increases). The viscosities are measured at 20 °C The thickening factor, therefore, is the factor by which viscosity increases upon mixing from the viscosity before mixing. The thickening factor is, for example, approximately 0.5 or greater and 10.0 or less. It should be noted that depending on the chemical makeup of the ink, the thickening factor can be less than 1.0; the viscosity can decrease. Even in that case, however, the term remains "thickening factor." The viscosities can be measured using a rheometer.

For the thickening factor of the first ink composition, the lower limit is preferably 2 or greater, more preferably 3 or greater, even more preferably 5 or greater. It is, however, more preferred that the lower limit be greater than 5, more preferably 5.5 or greater, even more preferably 6 or greater, particularly preferably 7 or greater. Preferably, furthermore, the lower limit is 10 or greater.

The upper limit to the thickening factor of the first ink composition is not limited, but preferably is 20 or less, more preferably 10 or less, even more preferably 9 or less, still more preferably 8.5 or less, yet more preferably 8 or less. A thickening factor of the first ink composition falling within these ranges is preferred because in that case characteristics such as image quality, resistance to cracking, abrasion resistance, and ejection stability are better. The quality of the resulting image, furthermore, is also superior. In particular, graininess can be reduced.

The thickening factor of the first ink composition can be adjusted primarily by varying the types, amounts, etc., of pigments (including resin dispersants) and resin particles. In particular, adjustment by varying the types, amounts, etc., of pigments (including resin dispersants) is preferred because it allows for easier adjustment.

1.2.3. Method for Attaching the First Ink Composition to the Recording Medium

The first ink attachment step may be performed in any scheme, provided that it is in a manner in which the first ink composition is attached while a scan in which the relative positions of the ink jet head and the recording medium are moved is made. Examples of ink jet schemes include the serial scheme and the line scheme. With such a configuration, high-mix low-volume printing can be efficiently performed with small equipment.

The maximum attachment density of the first ink composition in the first ink attachment step is preferably 1.5 mg/inch$^2$ or more. The maximum attachment density, furthermore, is preferably 3.0 mg/inch$^2$ or more, and it is preferred that the maximum attachment density be 4.0 mg/inch$^2$ or more. It is more preferred that the maximum attachment density be 11.0 mg/inch$^2$ or less, even more preferably 10.0 mg/inch$^2$ or less. Moreover, it is more preferred that the maximum attachment density be 9.0 mg/inch$^2$ or less, even more preferably 7.0 mg/inch$^2$ or less. With such an arrangement, an image with even better coverage can be obtained.

The mass (ng) of the droplets of the first ink composition in the first ink attachment step is preferably 8 ng or less, more preferably 1 ng or more and 8 ng or less, even more preferably 1 ng or more and 7 ng or less, still more preferably 2 ng or more and 6 ng or less. When expressed as a dot size (ng/dot), the mass (ng) of the droplets of the first ink composition in the first ink attachment step is preferably 8 ng/dot or less, more preferably 1 ng/dot or more and 8 ng/dot or less, even more preferably 1 ng/dot or more and 7 ng/dot or less, still more preferably 2 ng/dot or more and 6 ng/dot or less.

After the treatment solution is attached to the recording medium through the treatment solution attachment step, the attachment of ink to the recording medium through the first ink attachment step is performed through the first ink attachment step. In the first ink attachment step, the first ink composition is attached during the same scan as the scan (pass) in which the treatment solution is attached to the recording medium, to the same scan area as the treatment solution.

1.3. Second Ink Attachment Step

The second ink attachment step is a step in which a second ink composition, which is a water-based ink composition containing at least one colorant, is attached to the recording medium.

1.3.1. Second Ink Composition

The second ink composition is a water-based ink composition containing at least one colorant.

The second ink composition used in the recording method according to this embodiment is a water-based ink, containing water. Since the second ink composition is similar to the first ink composition described above, its description can be obtained by substituting "first ink composition" in the foregoing with "second ink composition." The characteristics and thickening factor of the second ink composition and the method for attaching it to the recording medium are also the same as those for the first ink composition, and their description can be obtained by substituting "first ink composition" in the foregoing with "second ink composition."

It should be noted that the second ink composition is preferably an ink that contains a colorant of a color different from that of the colorant contained in the first ink composition and presents a color different from that of the first ink composition. In that case, the recording method is a useful one as it supports multicolor printing, and this embodiment is preferred because image quality superior in, for example, graininess reduction is achieved.

1.4. Time Intervals and Order of the Attachment Steps

In the recording method according to this embodiment, the treatment solution, the first ink composition, and the second ink composition are attached to the recording medium through a scan in which the relative positions of the ink jet head and the recording medium are moved, the solution and compositions being attached to the same scan area during the same scan.

In the recording method according to this embodiment, furthermore, the duration from the landing of a solution droplet of the treatment solution on the recording medium through the treatment solution attachment step to the landing of an ink droplet of the first ink composition on the recording medium through the first ink attachment step is 0.15 seconds or more and 0.25 seconds or less. This duration is more preferably 0.17 seconds or more and 0.23 seconds or less.

Moreover, in the recording method according to this embodiment, the duration from the landing of the solution droplet of the treatment solution on the recording medium through the treatment solution attachment step to the landing of an ink droplet of the second ink composition on the recording medium through the second ink attachment step is 0.3 seconds or more and 0.6 seconds or less. This duration is more preferably 0.35 seconds or more and 0.5 seconds or less.

When the duration from the landing of the solution droplet of the treatment solution on the recording medium to the landing of the ink droplet of the first ink composition on the recording medium is less than 0.15 seconds, insufficient coverage and the formation of pinholes occur, and graininess also worsens. This is presumably because when the duration from the landing of the solution droplet of the treatment solution on the recording medium to the landing of the ink droplet of the first ink composition on the recording medium is short, the ink composition adheres in a state in which the drying of the treatment solution has not sufficiently progressed, causing the reaction of the ink composition to proceed too quickly.

When the duration from the landing of the solution droplet of the treatment solution on the recording medium to the landing of the ink droplet of the second ink composition on the recording medium is more than 0.6 seconds, density unevenness occurs. This is presumably because when the duration from the landing of the solution droplet of the treatment solution on the recording medium to the landing of the ink droplet of the second ink composition on the recording medium is long, the ink composition adheres in a state in which the drying of the treatment solution has excessively progressed, preventing the reaction of the ink composition from proceeding smoothly.

The treatment solution, the first ink composition, and the second ink composition are ejected from their respective nozzle rows disposed on the ink jet head. On the ink jet head, therefore, the nozzle row for the first ink composition is located at a position closer to the nozzle row for the treatment solution than the nozzle row for the second ink composition is. As a result of this, a difference arises between the time after the landing of the treatment solution on the recording medium until the landing of the first ink composition and the time until the landing of the second ink composition. The farther away the nozzle row for the first ink composition is positioned from the nozzle row for the second ink composition, the larger the difference between the times until the landing of their respective ink droplets.

The difference between the durations from the landing of the treatment solution to the landing of the ink droplets of the first ink composition and the second ink composition can be changed by parameters such as the nozzle row configuration on the ink jet head, the number of inks, the distance between the nozzle rows, and the scan speed of the ink jet head. This time lag, however, inevitably occurs as long as the nozzle row for the treatment solution, the nozzle row for the first ink composition, and the nozzle row for the second ink composition are arranged in this order on the ink jet head. In the recording method according to this embodiment, parameters such as the nozzle geometry on the ink jet head, the nozzle-to-nozzle distance, and the scan speed of the ink jet head are adjusted to ensure that the times until the landing of the ink droplets of the first ink composition and the second ink composition fall within the above ranges.

Ensuring that the durations from the landing of the treatment solution to the landing of the ink droplets of the first ink composition and the second ink composition fall within the above ranges, furthermore, is preferred because it increases flexibility in the design of the ink jet head. Using the recording method according to this embodiment with such an ink jet head is preferred because in that case superior graininess reduction and density unevenness reduction, for example, can be achieved.

It should be noted that inks other than the first ink composition and the second ink composition may be ejected from other nozzle rows. The number of inks ejected from nozzle rows in recording, therefore, may be three or more. The number of inks may be, for example, four to ten. In that case, the first ink composition and the second ink composition can be any of the three or more inks.

It is preferred that of all inks used for recording in the recording method according to this embodiment, the first ink to land after the landing of the treatment solution land at least 0.15 seconds after the landing of the treatment solution, and the last ink to land after the landing of the treatment solution land within 0.6 seconds of the landing of the treatment solution.

In recording, furthermore, it is preferred that all inks land at least 0.15 seconds after and within 0.6 seconds of the landing of the treatment solution. It would also be preferred that the landing of the other inks occur between the landing of the first ink composition and the landing of the second ink composition. Such an arrangement is preferred because it allows superior image quality to be achieved even when the number of inks is particularly large.

Meanwhile, the time lag between the landing of the droplet of the first ink composition on the recording medium and the landing of the second ink droplet on the recording medium is preferably 0.1 seconds or more and 0.5 seconds or less. In such cases, the advantage that better graininess and coverage pinholes in the resulting image, as well as abrasion resistance, can be achieved becomes more significant.

1.5. Other Steps

The recording method according to this embodiment includes attaching each of the treatment solution, the first ink composition, and the second ink composition to a recording medium. The recording method, however, may optionally include further attaching the treatment solution and one or more other ink compositions to the recording medium. There is no restriction on the order and number of such steps; such steps can be performed as necessary and as appropriate. These additional treatment solution and inks are preferably attached to the same area on the recording medium.

The recording method according to this embodiment may include, for example, a drying step in which liquids that have adhered to the recording medium are dried (primary heating step) and heating the recording medium (postheating step).

1.5.1. Drying Step

The recording method according to this embodiment may include a drying step (primary drying step). The recording method according to this embodiment may include drying the recording medium before or during an attachment step for the treatment solution or an ink composition. In addition to stopping recording and allowing the recording medium to stand, the drying step can be performed by drying the recording medium using a drying mechanism. Examples of methods for drying using a drying mechanism include blowing air at room temperature or warm air onto the recording medium (air-blow drying), irradiating the recording medium with a type of radiation that produces heat (e.g., infrared radiation) (radiation drying), using an element that transfers heat to the recording medium by contact (conduction drying), and combinations of two or more of these methods. When the recording method includes a drying step, it is more preferred that the drying step be performed by air-blow drying, among other methods.

A drying step (primary drying step) in which a drying mechanism that heats the recording medium is used as the drying mechanism is specifically referred to as a heating step (primary drying step). For example, a drying step in which air at room temperature is blown, among the drying mechanisms described above, does not qualify as a heating step.

It should be noted that in this embodiment, a certain level or better image quality is achieved through the use of the treatment solution. The recording method, therefore, may be performed without a primary heating step, or may even be performed without a primary drying step.

When a primary drying step is performed or not, it is preferred that the surface temperature of the recording medium at the time of attachment of the treatment solution and ink compositions be 45 °C or below. This surface temperature is preferably 20° C. or above.

This surface temperature is more preferably 20 °C or above and 45 °C or below. This surface temperature, furthermore, is preferably 27.0 °C or above and 40 °C or below, more preferably 28 °C or above and 39 °C or below. Moreover, this surface temperature is preferably from 30 °C to 38 °C, more preferably from 35 °C to 37 °C.

This temperature is the surface temperature of the portion of the recording surface of the recording medium subjected to the attachment of the liquids in the attachment steps, and is the highest temperature in the recording area during the attachment steps. A surface temperature that falls within or below these ranges would be more preferred in terms of clogging reduction. A surface temperature that falls within or above these ranges would be preferred because in that case image quality and abrasion resistance would be better.

For the surface temperature of the recording medium in the treatment solution attachment step, the first ink attachment step, and the second ink attachment step, a surface temperature of 45 °C or below would allow better graininess of the resulting image to be achieved.

The drying step can be performed simultaneously with one or two or more of the treatment solution attachment step and ink attachment steps described above. When the drying step is performed simultaneously with an ink attachment step, it is preferred that the surface temperature of the recording medium be 30 °C or below, more preferably 28 °C or below.

When a drying step in which the recording medium is dried is performed before the treatment solution attachment step or during the treatment solution attachment step, the surface temperature of the recording medium at the time of adhesion of the treatment solution to the recording medium is 30.0 °C or above, preferably 35.0 °C or above, more preferably 40.0 °C or above. With such an arrangement, it is easier for the treatment solution to form a coating, for example when resin particles are contained in the treatment solution. It may be, therefore, possible to further enhance the adhesion and abrasion resistance of the resulting image.

Each attachment step may be performed without a primary heating step. With such an arrangement, better ejection stability of, for example, the inks can be achieved. Each attachment step, furthermore, may be performed without a primary drying step.

1.5.2. Postheating Step

The recording method according to this embodiment may further include a postheating step, in which the recording medium is heated, after each attachment step described above. The postheating step can be performed using, for example, an appropriate heater. The postheating step is performed using, for example, an afterheater. (In an example of an ink jet recording apparatus described later herein, the heating heater 59 corresponds to it.) The heater does not need to be a heating component included in the ink jet recording apparatus, but may be another type of dryer. This allows the resulting image to be more sufficiently fixed through drying, thereby allowing, for example, the recorded article to be brought into a ready-for-use state quickly.

The temperature of the recording medium in that case is not particularly limited. It can be, however, set considering factors such as the Tg of the resin component constituting resin particles contained in the recorded article. When the Tg of the resin component constituting resin particles or wax is considered, it would be appropriate to set the temperature higher than the Tg of the resin component constituting the resin particles by 5.0 °C or more, preferably 10.0 °C or more.

The surface temperature of the recording medium reached through the heating in the postheating step is 30.0 °C or above and 120.0 °C or below, preferably 40.0 °C or above and 100.0 °C or below, more preferably 50.0 °C or above and 95 °C or below, even more preferably is 70 °C or above and 90 °C or below. The surface temperature of the recording medium reached through the heating in the postheating step is particularly preferably 80 °C or above. When the temperature of the recording medium falls approximately within these ranges, the formation and flattening of a coating by resin particles or wax contained in the recorded article can be achieved. The resulting image, furthermore, can be more sufficiently fixed through drying.

1.6. Advantages and Further Details

With this recording method, good graininess, coverage pinholes, and density unevenness in the resulting image can be achieved by virtue of the use of a surfactant for which the surface tension of a 0.1% aqueous solution of the surfactant and the surface tension of a 0.1% propylene glycol solution of the surfactant are both 28.0 mN/m or less as a silicone surfactant used in the treatment solution.

With this recording method, furthermore, it can be ensured that the residual amounts of water and organic solvents in the treatment solution after its landing are appropriate because the duration from the landing of the solution droplet of the treatment solution on the recording medium to the landing of the ink droplet of the first ink composition on the recording medium is 0.15 seconds or more and 0.25 seconds or less, and the duration from the landing of the solution droplet of the treatment solution on the recording medium to the landing of the ink droplet of the second ink composition on the recording medium is 0.3 seconds or more and 0.6 seconds or less. As a result, good wettability and spreadability of ink droplets upon contact with droplets of the treatment solution can be achieved.

The wettability and spreadability of ink droplets upon contact with droplets of a treatment solution appear to be associated with the surface tension of the treatment solution at the time of contact with the ink droplets. In this recording method, a surfactant for which the surface tension of a 0.1% aqueous solution of the surfactant and the surface tension of a 0.1% propylene glycol solution of the surfactant are both 28.0 mN/m or less is used, which ensures that ink droplets coming into contact with the treatment solution at a time shortly after its landing and ink droplets coming into contact with the treatment solution at a time late after its landing have similar levels of wettability and spreadability. Presumably because of this, superior graininess, coverage pinholes, and density unevenness in the resulting image can be achieved.

2. RECORDING APPARATUS

A recording apparatus according to this embodiment is a recording apparatus that performs the recording method described above and includes the treatment solution, the first ink composition, and the second ink composition and an ink jet head that ejects the treatment solution, the first ink composition, and the second ink composition.

For the treatment solution and ink compositions that the recording apparatus according to this embodiment includes, the description is omitted because they are as described above. In the following, examples of recording apparatuses according to this embodiment will be described with reference to drawings.

With the recording apparatus according to this embodiment, recovery from clogging of nozzles, image quality (bleed-related unevenness), and the reduction of whitening of printed articles are superior because recording is performed by the recording method described above.

For the treatment solution and ink compositions that the recording apparatus according to this embodiment includes, the description is omitted because they are as described above. In the following, examples of recording apparatuses according to this embodiment will be described with reference to drawings.

2.1. Serial Recording Apparatus

Figure 2:
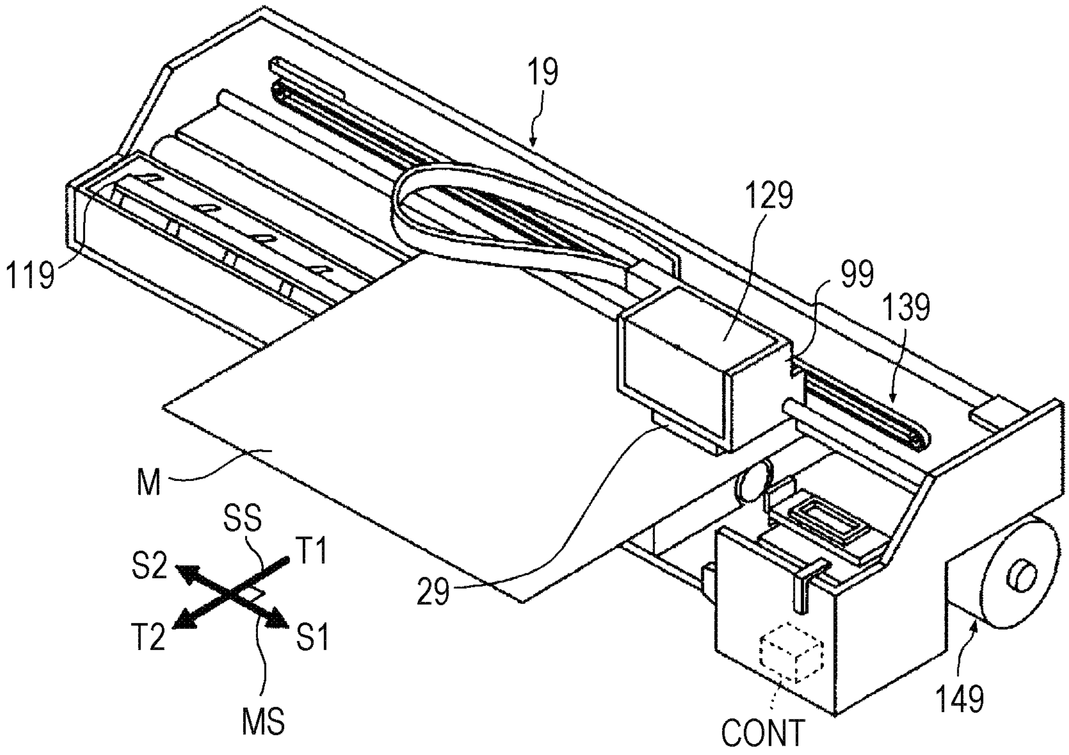
FIG. 2 is a perspective view illustrating an example of a structure of the carriage and related components of a serial ink jet recording apparatus.

FIG. 1 is an outline cross-sectional view schematically illustrating a serial ink jet recording apparatus 19. FIG. 2 is a perspective view illustrating an example of a structure of the carriage and related components of the serial ink jet recording apparatus 19 in FIG. 1. As illustrated in FIGS. 1 and 2, the ink jet recording apparatus 19 includes an ink jet head 29, an IR heater 391, a platen heater 49, a heating heater 59, a cooling fan 69, a preheater 79, a ventilation fan 89, a carriage 99, a platen 119, a carriage-moving mechanism 139, a transporter 149, and a control section CONT. The ink jet recording apparatus 19 is controlled by the control section CONT illustrated in FIG. 2 with regard to the overall operation of the ink jet recording apparatus 19.

The ink jet head 29 includes, for example, an ink jet head 29*a* and an ink jet head 29*b* positioned symmetrically about the sub-scan direction SS to allow the treatment solution, the first ink composition, and the second ink composition to land in this order during a bidirectional scan in the main scan direction MS. When the carriage 99 is passed in the S1 direction, the treatment solution is ejected from the nozzle row positioned at the end in the S1 direction on the ink jet head 29*a*, the first ink composition is ejected from the nozzle row adjacent to the nozzle row from which the treatment solution is ejected, and the second ink composition is ejected from the nozzle row positioned at the end in the S2 direction on the ink jet head 29*a*. Likewise, when the carriage 99 is passed in the S2 direction, the treatment solution is ejected from the nozzle row positioned at the end in the S2 direction on the ink jet head 29*b*, the first ink composition is ejected from the nozzle row adjacent to the nozzle row from which the treatment solution is ejected, and the second ink composition is ejected from the nozzle row positioned at the end in the Si direction on the ink jet head 29*b*.

Alternatively, when the carriage 99 is passed in the S1 direction during recording performed through bidirectional scans, the treatment solution is ejected from the nozzle row positioned at the end in the S1 direction on the ink jet head 29*b*, the first ink composition is ejected from the nozzle row adjacent to the nozzle row from which the treatment solution is ejected, and the second ink composition is ejected from the second nozzle row from the end in the S2 direction on the ink jet head 29*a*. Likewise, when the carriage 99 is passed in the S2 direction, the treatment solution is ejected from the nozzle row positioned at the end in the S2 direction on the ink jet head 29*a*, the first ink composition is ejected from the nozzle row adjacent to the nozzle row from which the treatment solution is ejected, and the second ink composition is ejected from the second nozzle row from the end in the Si direction on the ink jet head 29*b*. Such an arrangement is also allowed, and it is preferred because in this case the number of inks used for recording is large; the number of inks is eight.

Alternatively, when the carriage 99 is passed in the S1 direction during unidirectional printing, the treatment solution is ejected from the nozzle row positioned at the end in the S1 direction on the ink jet head 29*b*, the first ink composition is ejected from the nozzle row adjacent to the nozzle row from which the treatment solution is ejected, and the second ink composition is ejected from the nozzle row positioned at the end in the S2 direction on the ink jet head 29*a*. Recording is performed solely through scans in the S1 direction in this manner. This is preferred because in this case the number of inks that can be used is nine.

The ink jet head 29 is a serial ink jet head and attaches the treatment solution and ink compositions (hereinafter also referred to as "the solution and inks") to a recording medium M by being passed multiple times in the main scan direction MS relative to the recording medium M. The ink jet head 29 is mounted on the carriage 99, which is illustrated in FIG. 2. Through the operation of the carriage-moving mechanism 139 to move the carriage 99 in the medium width direction, i.e., the direction along the width of the recording medium M, the ink jet head 29 is passed multiple times in the main scan direction relative to the recording medium M. The medium width direction is the direction in which the ink jet head 29 makes main scans. A movement in the main scan direction is also referred to as a main scan.

Figure 3:
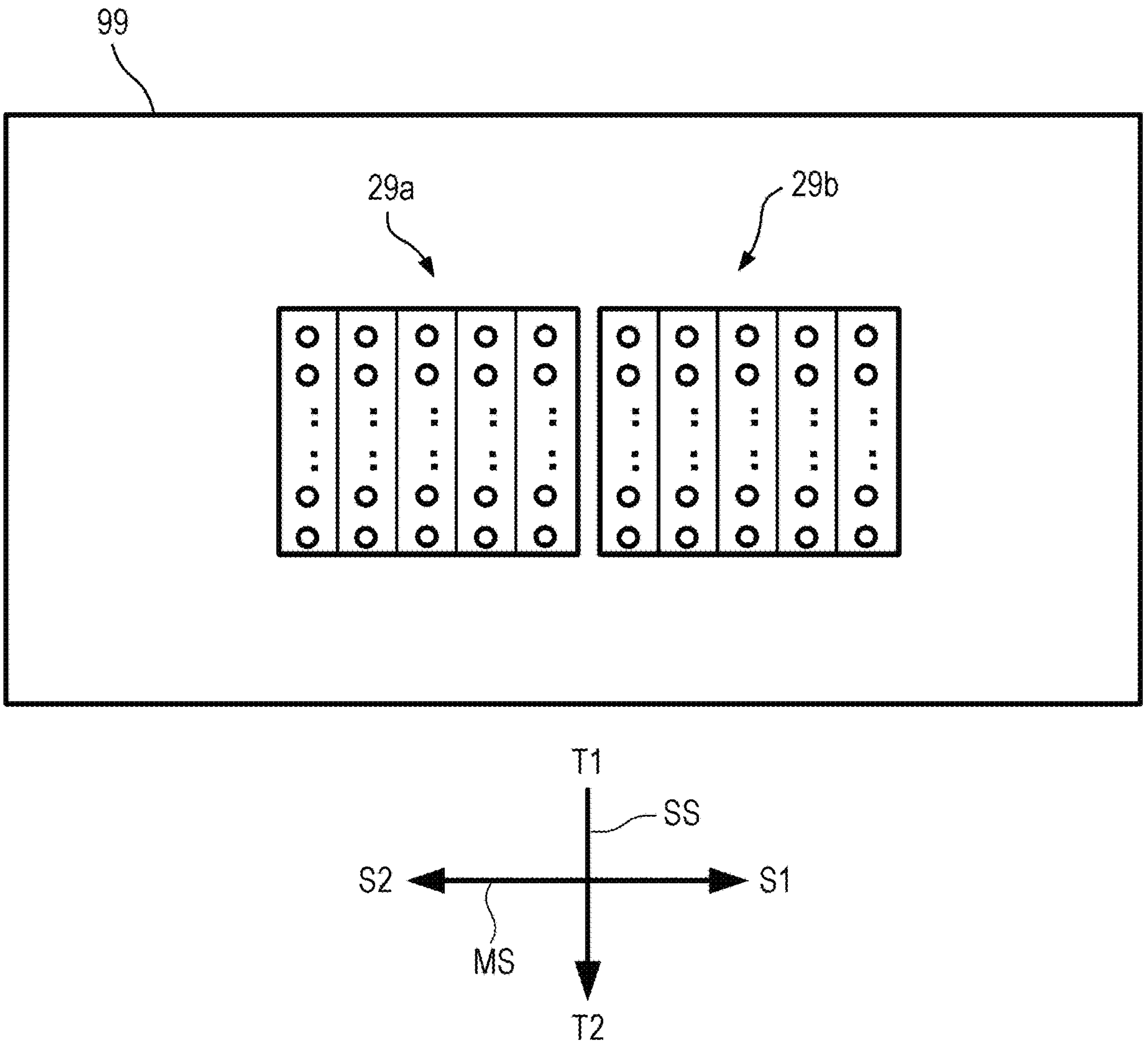
FIG. 3 is a schematic view illustrating an example of an ink jet head layout.

FIG. 3 illustrates a layout in which the nozzle row that ejects the treatment solution is arranged side-by-side with the nozzle rows that eject the ink compositions and aligned with them in the direction of transport of the recording medium M (the T2 direction). In this case, the nozzle rows are arranged such that if a projected image of the nozzle row that ejects the treatment solution were created in the direction of movement of the head (MS), it would completely overlap with the nozzle rows that eject the inks in the direction of the nozzle rows (SS).

With such a layout, the treatment solution attachment step, the first ink attachment step, and the second ink attachment step in the recording method described above can be performed through a scan carried out while the carriage is moved relative to the recording medium, and these steps can be conducted in a manner in which the treatment solution and the ink compositions are attached to the same scan area during the same scan (one-pass application). It should be noted that the nozzle rows illustrated in FIG. 3 are the nozzle rows that eject the solution and inks on each ink jet head. The ink jet heads 29*a* and 29*b* together form the ink jet head 29 as a whole.

The main scan direction is the direction in which the carriage 99 with the ink jet head 29 mounted thereon moves. In FIG. 1, the main scan direction is the direction that crosses the sub-scan direction, which is the direction of transport of the recording medium M, indicated by arrow SS. In FIG. 2, the direction along the width of the recording medium M, i.e., the direction represented by S1-S2, is the main scan direction MS, and the direction represented by T1→T2 is the sub-scan direction SS. During one scan, a scan is made in the main scan direction, i.e., in the direction of either arrow Si or arrow S2. By repeatedly making a main scan with the ink jet head 29 and a sub-scan, which is the transport of the recording medium M, multiple times, an image is recorded on the recording medium M. The treatment solution attachment step and the ink attachment steps, therefore, are performed through multiple main scans, in which the ink jet head 29 moves in the main scan direction, and multiple sub-scans, in which the recording medium M moves in the sub-scan direction, which crosses the main scan direction.

The cartridge 129 that supplies the solution and inks to the ink jet head 29 includes multiple independent cartridges. The cartridge 129 is detachably attached to the carriage 99 with the ink jet head 29 mounted thereon. Each of the multiple cartridges can be loaded with different one of the solution and inks, and the solution and inks are supplied from the cartridge 129 to the nozzles. Although in this embodiment an example is presented in which the cartridge 129 is attached to the carriage 99, the configuration is not limited to this. A form in which the cartridge 129 is disposed elsewhere than the carriage 99 and in which the solution and inks are supplied to the nozzles via supply tubes, not illustrated, is also permitted.

The ejection from the ink jet head 29 can be achieved using schemes known in the related art. In this embodiment, the scheme in which droplets are ejected utilizing vibrations of piezoelectric elements, i.e., the ejection scheme in which ink droplets are formed using mechanical deformations of electrostrictive elements, is used.

The ink jet recording apparatus 19 includes a ventilation fan 89, an IR heater 391, and a platen heater 49 for drying the solution and inks that have been ejected from the ink jet head 29 and adhered to the recording medium M. A primary drying step can be performed by using these ventilation fan 89, IR heater 391, and platen heater 49 in combination as appropriate. In the primary drying step, it is not necessarily required to heat the recording medium M; it may be a drying step in which the ventilation fan 89 is used alone as the implementation of air blowing at room temperature.

By using the IR heater 391, the recording medium M can be heated by radiation heating, through irradiation with infrared radiation from the ink jet head 29 side. This allows the temperature of the recording medium M to be raised without being affected by the thickness of the recording medium M compared to when the recording medium M is heated from the backside, for example with the platen heater 49, although the ink jet head 29 is often heated simultaneously. The ink jet recording apparatus 19 also includes types of fans that dry the solution and inks on the recording medium M by blowing warm air or air at the same temperature as the environment onto the recording medium M (e.g., the ventilation fan 89).

The platen heater 49 can heat the recording medium M, via the platen 119, at a position facing the ink jet head 29 to ensure that the solution and inks ejected by the ink jet head 29 can be dried soon after the time of their attachment to the recording medium M. The platen heater 49 is a heater capable of heating the recording medium M by conduction heating and allows the solution and inks to be attached to the recording medium M heated by it.

The upper limit to the surface temperature of the recording medium M reached through heating by the IR heater 391 and the platen heater 49 or when such heating is not performed is preferably 45 °C or below, more preferably 40 °C or below, even more preferably 35 °C or below, still more preferably 30 °C or below. It is, furthermore, preferred that the upper limit be 25 °C or below. The lower limit is preferably 20 °C or above, more preferably 30 °C or above, even more preferably 35 °C or above.

The heating heater 59 is a heater that dries and solidifies the solution and inks attached to the recording medium M, i.e., a heater for secondary drying or secondary heating. The heating heater 59 can be used for a secondary heating step. Through the heating of the recording medium M with an image recorded thereon by the heating heater 59, the water, for example, contained in the solution and inks evaporates and disperses more quickly. In such a manner, an ink film becomes firmly fixed on or firmly adheres to the recording medium M, resulting in superior film formation. As a result, a superior, high-quality image is obtained in a short time.

The upper limit to the surface temperature of the recording medium M reached through heating by the heating heater 59 is preferably 120 °C or below, more preferably 100 °C or below, even more preferably 80 °C or below. The lower limit to the surface temperature of the recording medium M is preferably 50 °C or above, more preferably 60 °C or above, even more preferably 70 °C or above. With a temperature falling within these ranges, a high-quality image tends to be obtained in a short time.

The ink jet recording apparatus 19 may include a cooling fan 69. By drying the solution and inks attached to the recording medium M and then cooling the solution and inks on the recording medium M using the cooling fan 69, an ink coating can be formed on the recording medium M with good adhesion.

The ink jet recording apparatus 19 may include a preheater 79 that preheats the recording medium M before the solution and inks are attached to the recording medium M. The ink jet recording apparatus 19, furthermore, may include a ventilation fan 89 to ensure that the solution and inks that have adhered to the recording medium M dry more efficiently.

Below the carriage 99, there are a platen 119, which supports the recording medium M, a carriage-moving mechanism 139, which moves the carriage 99 relative to the recording medium M, and a transporter 149, which is a roller that transports the recording medium M in the sub-scan direction. The operations of the carriage-moving mechanism 139 and the transporter 149 are controlled by the control section CONT.

2.2. Lateral Recording Apparatus

Figure 4:
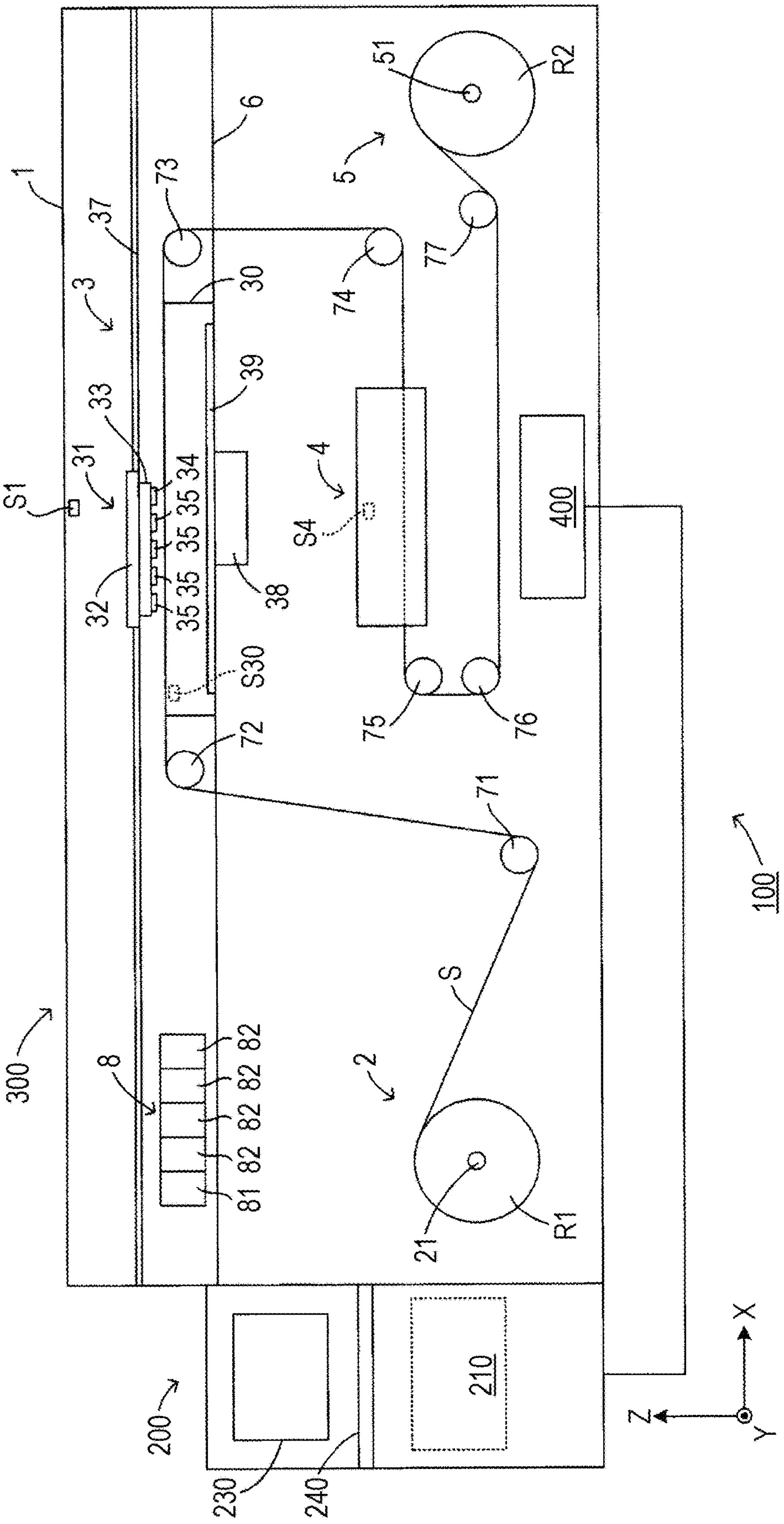
FIG. 4 is a front view schematically illustrating an example of another serial recording apparatus.

FIG. 4 is a front view schematically illustrating an example of a lateral recording apparatus. A lateral recording apparatus is a type of serial recording apparatus, in which the direction of movement of the carriage and the direction of transport of the recording medium are the same.

Figure 5:
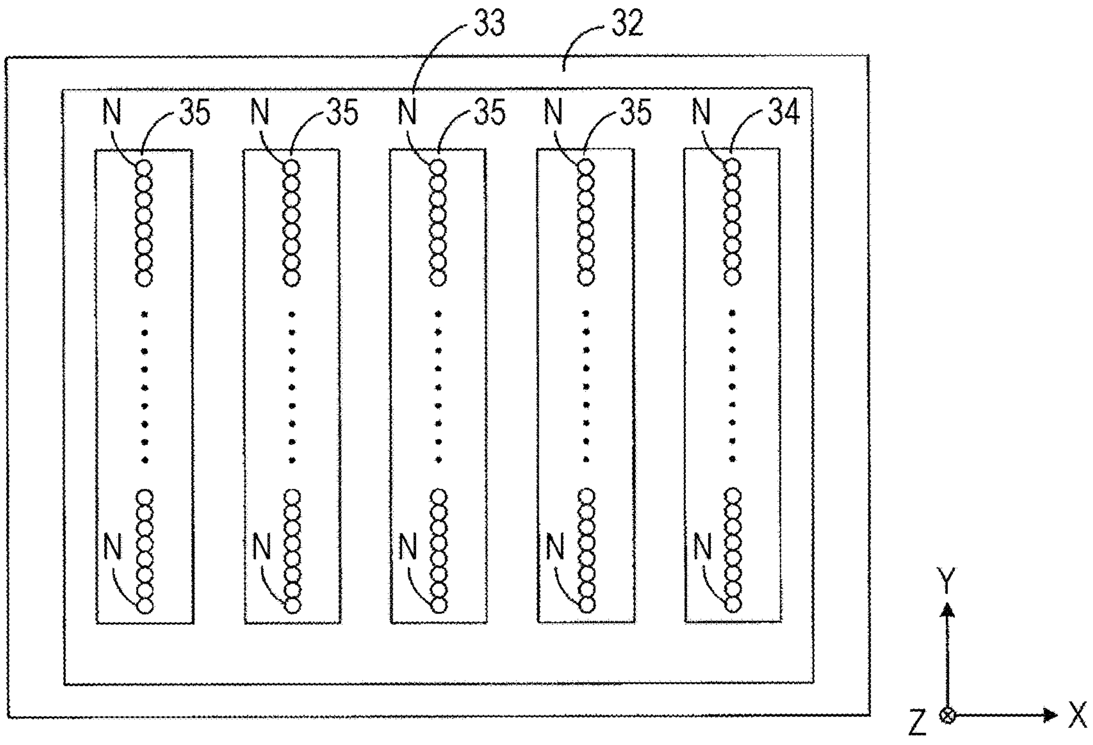
FIG. 5 is a bottom view partially illustrating another ink jet head configuration.

In FIGS. 4 and 5, an XYZ Cartesian coordinate system in which the Z axis is the vertical axis is also presented to clarify the positional relationship between the individual sections of the apparatus. In the following description, the direction in which each coordinate axis (or arrow) faces is treated as the positive direction, and the opposite direction as the negative direction, as necessary. It should be noted that the form of the recording apparatus illustrated in FIG. 4, in which the transport of the recording medium is performed in the direction along the axis of the scanning direction, is also specifically referred to as a lateral recording apparatus.

The recording apparatus 100 includes a host device 200, which generates printing data from image data (bitmap data) received from an external apparatus, such as a personal computer, and a printer section 300, which prints an image based on the printing data received from the host device 200. This printer section 300 is a section that prints an image on the surface of a long sheet S using ink jet technology while transporting the sheet S in a roll-to-roll manner.

As illustrated in FIG. 4, the printer section 300 includes a body enclosure 1 having a substantially cuboid shape. Inside the body enclosure 1, there are an unwinding section 2, which feeds the sheet S out of a roll R1, which is a roll of the sheet S, a printing chamber 3, in which inks are ejected onto the surface of the fed sheet S to perform printing, a drying section 4, which dries the sheet S with the inks adhering thereto, and a winding section 5, which winds the dried sheet S as a roll R2.

To be more specific, the inside of the body enclosure 1 is partitioned into upper and lower regions, in the direction along the Z axis, by a flat-plate base stage 6 positioned parallel to the XY plane (i.e., horizontally), with the upper region in relation to the base stage 6 being the printing chamber 3. Substantially in the middle of the inside of the printing chamber 3, a platen 30 is secured to the upper surface of the base stage 6. The platen 30 has a rectangular shape and supports the sheet S from below with its upper surface, which is parallel to the XY plane. A recording unit 31 performs printing on the surface of the sheet S supported on the platen 30.

Below the base stage 6, the unwinding section 2, the drying section 4, and the winding section 5 are situated. The unwinding section 2 is positioned below and in the negative direction along the X axis in relation to the platen 30 (diagonally to the lower left in FIG. 4) and includes a rotatable unwinding shaft 21. The sheet S is rolled around this unwinding shaft 21, and the roll R1 is supported by the shaft. The winding section 5 is positioned below and in the positive direction along the X axis in relation to the platen 30 (diagonally to the lower right in FIG. 4) and includes a rotatable winding shaft 51. The sheet S is rolled around this winding shaft 51, and the roll R2 is supported by the shaft. The drying section 4, furthermore, is positioned immediately below the platen 30, between the unwinding section 2 and the winding section 5 in the direction along the X axis.

Then, after the sheet S unwound from the unwinding shaft 21 in the unwinding section 2 has sequentially passed through the printing chamber 3 and the drying section 4 while being guided by rollers 71 to 77, the sheet S is wound by the winding shaft 51 in the winding section 5. The rollers 72 and 73 are arranged parallel to the direction along the X axis (i.e., horizontally) in such a manner as to sandwich the platen 30 therebetween, with their positions adjusted so that their top portions are level with the upper surface (the surface that supports the sheet S) of the platen 30. The sheet S wrapped around the roller 72, therefore, moves horizontally (in the direction along the X axis) while sliding against the upper surface of the platen 30 until it arrives at the roller 73.

In the printing chamber 3, processing for printing on the sheet S is conducted by the recording unit 31, which is positioned above the platen 30. This recording unit 31 prints an image on the surface of the sheet S by ejecting a treatment solution and ink compositions onto the surface of the sheet S. At the end of the inside of the printing chamber 3 in the negative direction along the X axis (the left end in FIG. 4), there is a cartridge attachment section 8. To the cartridge attachment section 8, a treatment solution cartridge 81, which stores the treatment solution, and multiple ink cartridges 82, which store the ink compositions, have been detachably attached. The recording unit 31, furthermore, is capable of ejecting the treatment solution supplied from the treatment solution cartridge 81 and the ink compositions supplied from the ink cartridges 82 individually onto the surface of the sheet S by ink jet technology.

FIG. 5 is a bottom view partially illustrating the structure of the recording unit. In this example, the details of the recording unit 31 will be described while using FIGS. 4 and 5. This recording unit 31 includes a carriage 32, a flat-plate supporting plate 33 attached to the lower surface of the carriage 32, and an ink jet head for treatment solution 34 and ink jet heads for ink 35 attached to the lower surface of the supporting plate 33. On the lower surface of the supporting plate 33, four ink jet heads for ink 35 and one ink jet head for treatment solution 34 are arranged at equal pitches in the direction along the X axis. Each ink jet head 34 or 35 has multiple nozzles N (a nozzle row) arranged parallel to the direction along the Y axis. The ink jet head for treatment solution 34 ejects the treatment solution from the nozzles N, and each of the four ink jet heads for ink 35 ejects ink of a different color from the nozzles N.

In this embodiment, the first ink composition is ejected from the ink jet head for ink 35 positioned next to the ink jet head for treatment solution 34, and the second ink composition is ejected from the ink jet head for ink 35 at the farthest position from the ink jet head for treatment solution 34.

The lengths, in the direction along the Y axis, of the nozzle rows that the ink jet head for treatment solution 34 and the ink jet heads for ink 35 have are preferably equal to or greater than the length of the sheet S (recording medium) in the direction along the Y axis. With ink jet heads having such a length, recording can be performed in one pass, resulting in superiority in recording speed. Bleed-related unevenness, however, is likely to occur due to large attachment densities of the inks. With the recording apparatus according to this embodiment, by contrast, it tends to be possible to achieve superior image quality (bleed-related unevenness), even when performing recording in one pass, because the apparatus is one that uses the recording method described above.

In FIG. 5, the nozzle rows are arranged such that if a projected image of the nozzle row that ejects the treatment solution, which the ink jet head for treatment solution 34 has, were created in the direction of movement of the head (the direction along the X axis), it would completely overlap with the nozzle rows that eject inks, which the ink jet heads for ink 35 have, in the direction of the nozzle rows (the direction along the Y axis). With such a layout, the treatment solution attachment step and ink attachment steps in the recording method described above can be performed through a scan carried out while the ink jet head for treatment solution and the ink jet heads for ink are moved relative to the recording medium, and these steps can be conducted in a manner in which the treatment solution and the ink compositions are attached to the same scan area during the same scan (perfectly simultaneous application).

It should be noted that the ink jet head 29 illustrated in FIG. 3 may be used as the ink jet head that the recording unit has. In this example, however, the ink jet head illustrated in FIG. 5 is used.

It is, furthermore, also possible to use the ink jet head illustrated in FIG. 5 as the ink jet head of the recording unit that the recording apparatus in FIG. 2 has.

Although the number of ink jet heads is five in FIG. 5, the number of ink jet heads only needs to be three or more; for example, it may be from seven to twenty. The number of ink jet heads can also be considered the number of nozzle rows in other words. An ink jet head is a unit that ejects one ink or treatment solution; therefore, it can also be considered a nozzle row.

The number of ink jet heads, furthermore, may be matched to the number of inks.

The description is continued referring back to FIG. 4. The carriage 32 of the recording unit 31 configured as described above is designed to be movable as a single unit with the supporting plate 33 and the ink jet head for treatment solution 34 and ink jet heads for ink 35. More specifically, inside the printing chamber 3, there is an X-axis guiderail 37 extending parallel to the direction along the X axis. The carriage 32 moves in the direction along the X axis on the X-axis guiderail 37 when receiving a driving force generated by an X-axis motor.

Then the recording unit 31 prints an image on the surface of the sheet S that stops on the upper surface of the platen 30 by ejecting the treatment solution from the ink jet head for treatment solution 34 and inks from the ink jet heads 35 for ink and attaching the treatment solution and ink compositions to the same scan area during the same scan while moving (passing) the carriage 32 in the direction along the X axis (the main scan direction or the scanning direction) above the platen 30. Through this, on the surface of the sheet S, a two-dimensional image corresponding to one frame, which is the distance over which the carriage 32 is passed in the direction along the X axis, is printed with the length of the nozzle rows in the Y direction. The colorants in the inks forming the two-dimensional image, furthermore, aggregate because of the action of the treatment solution and become fixed on the surface of the sheet S.

Such one-frame printing is repeatedly conducted while the sheet S is intermittently moved in the direction along the X axis. Specifically, a predetermined range that extends over substantially the entire area of the upper surface of the platen 30 serves as the printing area. The sheet S is intermittently transported in the direction along the X axis, with the distance corresponding to the length of this printing area in the direction along the X axis (intermittent transportation distance) being one unit, and one-frame printing is performed on the sheet S that stops on the upper surface of the platen 30 during the intermittent transportation. In other words, after one-frame printing ends on the sheet S that stops at the platen 30, the sheet S is transported in the direction along the X axis by the intermittent transportation distance, and an unprinted surface of the sheet S stops at the platen 30.

Subsequently, new one-frame printing is conducted on this unprinted surface. After it is complete, the sheet S is again transported in the direction along the X axis by the intermittent transportation distance. Then this series of operations is repeatedly conducted.

Recording corresponding to one frame on the recording medium at rest may be performed in one pass as described above or may be performed through two or more passes. When recording is performed through two or more passes, the ink jet head may be moved in the Y direction between passes. This is preferred because in that case the recording resolution in the Y direction can be increased. The number of passes is preferably ten or fewer, more preferably four or fewer.

To keep the sheet S resting on the upper surface of the platen 30 flat during the intermittent transportation, the platen 30 may include a mechanism that attracts the sheet S resting on its upper surface. Specifically, the upper surface of the platen 30 is perforated with numerous aspiration holes, not illustrated. To the lower surface of the platen 30, an aspirator 38 has been attached. As the aspirator 38 operates, negative pressure is generated in the aspiration holes in the upper surface of the platen 30, causing the sheet S to be attracted onto the upper surface of the platen 30. While the sheet S is at rest on the platen 30 for printing, the aspirator 38 keeps the sheet S flat by attracting the sheet S. After printing ends, the aspirator 38 ceases attracting the sheet S, allowing for smooth transportation of the sheet S.

To the lower surface of the platen 30, a heater 39 may have been attached. This heater 39 is one capable of heating the platen 30 to a predetermined temperature (e.g., 30 °C) as necessary. This enables a configuration in which the sheet S is subjected to primary drying by heat from the platen 30 while undergoing processing for printing by the ink jet head for treatment solution 34 and the ink jet heads for ink 35.

In the case of the recording apparatus according to this embodiment, however, the heating of the recording medium may be performed using a heating mechanism for heating the recording medium included in the component supporting the recording medium (e.g., the heater 39) or a heating mechanism for heating the recording medium from above (not illustrated) in such a location subjected to the attachment of ink compositions, such as on the platen 30. Examples of heating mechanisms for heating the recording medium from above include a blowing fan and an IR heater. Even when heating is performed, the surface temperature of the recording medium at the time of ink attachment can be the same as in the example of a recording apparatus in FIG. 1.

This makes it easier to ensure that the surface temperature of the recording medium when inks are attached is 45 °C or below, preferably 35 °C or below. In that case, better recovery from clogging tends to be achieved.

The sheet S that has undergone one-frame printing in this manner moves from the platen 30 to the drying section 4 as the intermittent transportation of the sheet S proceeds. This drying section 4 is a section capable of conducting, using air heated for drying, a postheating step in which the treatment solution and ink compositions that have landed on the sheet S are completely dried.

At the drying section 4, the surface temperature that the sheet S reaches can be the same as in the example of a recording apparatus in FIG. 1. It is preferred to heat the sheet S such that its surface temperature is 30.0 °C or above and 120.0 °C or below, preferably 40.0 °C or above and 100.0 °C or below, more preferably 50.0 °C or above and 95 °C or below, even more preferably 70 °C or above and 90 °C or below.

Then the sheet S that has undergone drying treatment arrives at the winding section 5 as the intermittent transportation of the sheet S proceeds, and is wound as the roll R2.

Figure 6:
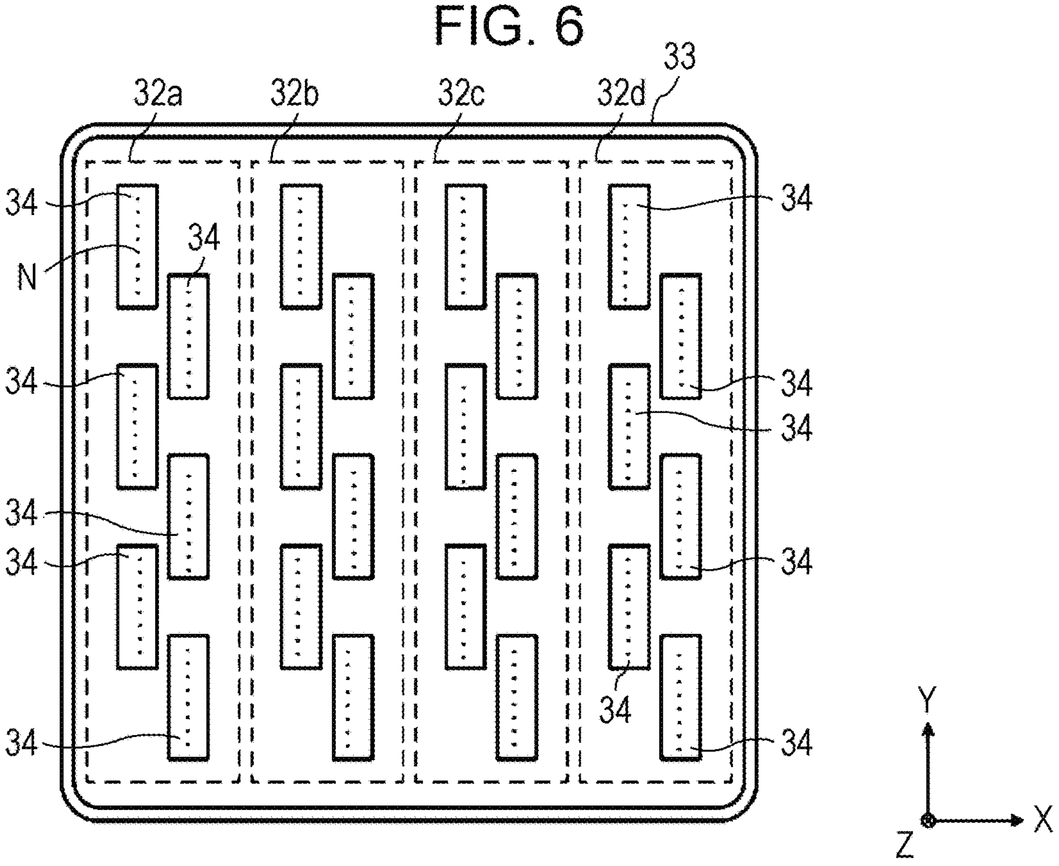
FIG. 6 is a bottom view partially illustrating yet another ink jet head configuration.

FIG. 6 is another example for the ink jet head of the recording units in FIGS. 3 and 5. In FIG. 6, similarly to FIG. 5, an ink jet head for treatment solution 32*d* and ink jet heads for ink 32*a* to 32*c* are situated on a supporting plate 33. In the example in FIG. 6, each one of the ink jet heads 32*a* to 32*d* is composed of multiple unit heads 34 arranged in the Y direction. Each unit head 34 has a nozzle row N. Within a single ink jet head, there is a portion in which the positions of the nozzles in the X direction vary from nozzle to nozzle. In particular, there is a portion in which the positions of the nozzles in the X direction vary from unit head to unit head.

Configuring the ink jet head in such a manner is preferred because it allows for easier manufacture of an ink jet head long in the Y direction. In that case, the length in the X direction of the entire ink jet head tends to be long, making the recording method according to this embodiment particularly useful and preferred. The length in the X direction of the entire ink jet head is the length from the nozzles on the ink jet head at one end in the X direction to the nozzles on the ink jet head at the other end.

Although the number of ink jet heads for ink is three in the example in FIG. 6, this number is not limited to three and only needs to be two or more; for example, it may be from two to twenty. The same also applies to FIGS. 3 and 5. In that case, the number of inks can be large, enabling multi-color printing. The length in the X direction of the entire ink jet head, however, tends to be large, making this embodiment particularly useful.

Similarly to the example in FIG. 3, furthermore, the recording unit may have two ink jet heads for treatment solution.

In each drawing, the nozzle-to-nozzle distance between the ink jet head for the treatment solution and the ink jet head for the first ink is preferably from 30 to 230 mm, more preferably from 50 to 200 mm, even more preferably from 100 to 190 mm, particularly preferably from 130 to 180 mm. The nozzle-to-nozzle distance between the ink jet head for the treatment solution and the ink jet head for the second ink is preferably from 200 to 500 mm, more preferably from 250 to 400 mm, still more preferably from 300 to 360 mm, particularly preferably from 320 to 340 mm.

The scan speed is preferably from 200 to 1500 mm/second, more preferably from 500 to 1000 mm/second, even more preferably from 600 to 800 mm/second. The scan speed is the movement speed of the ink jet head in the serial scheme and the transport speed of the recording medium in the line scheme.

These are preferred in terms of flexibility in the design of the recording apparatus because in these cases it is easier to ensure that the time lags between the landings of the treatment solution and the inks are as in this embodiment.

Figure 7:
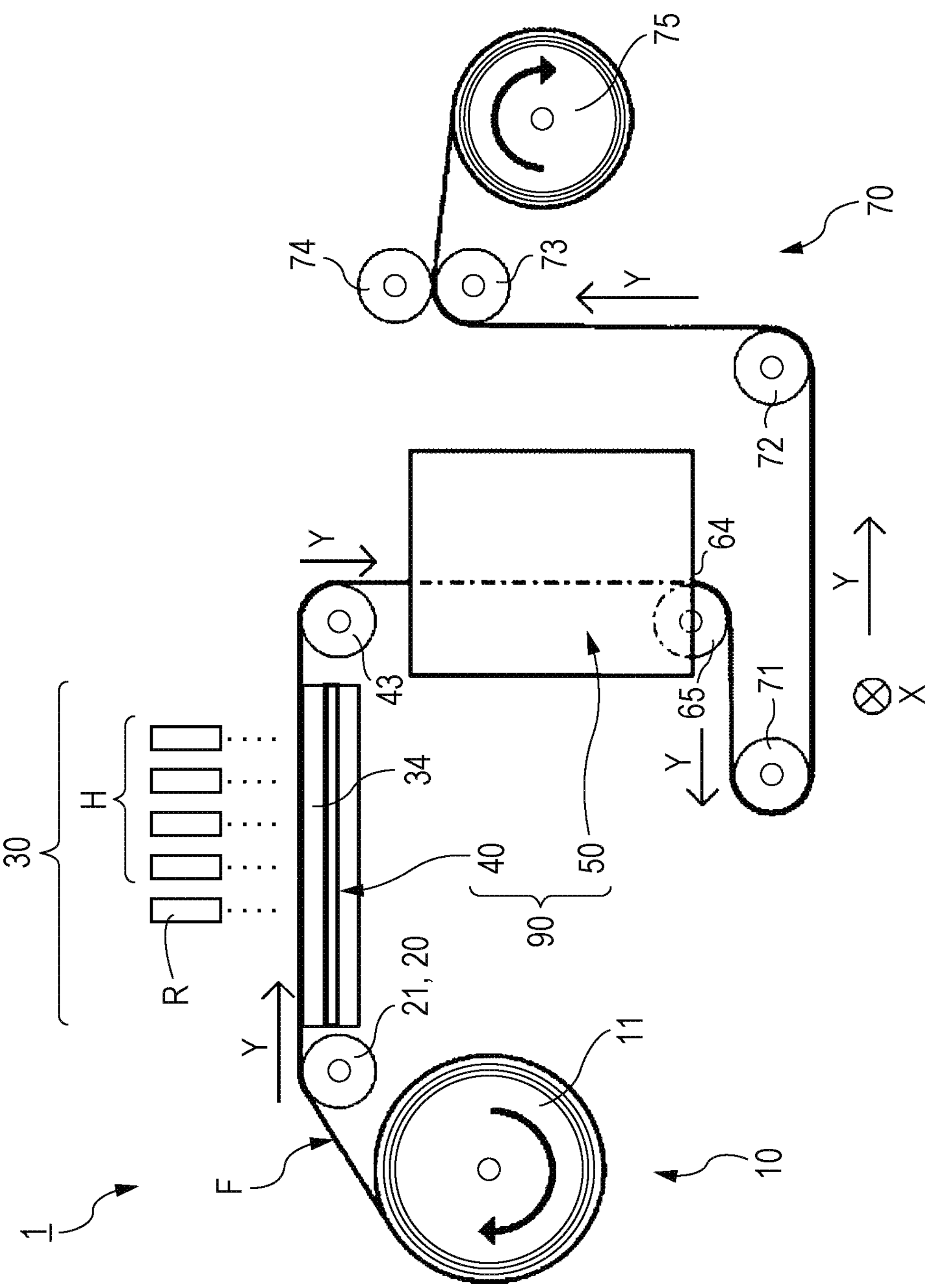
FIG. 7 is an outline cross-sectional view schematically illustrating a line ink jet recording apparatus.

FIG. 7 is an example of a line recording apparatus. The line recording apparatus 1 includes a feeding section 10 for the recording medium F, a transport section 20, a recording section 30, a drying device 90, and an ejection section 70.

The drying device 90 includes a first drying section 40, which performs a drying step, and a second drying section 50, which performs a postheating step.

The feeding section 10 is provided such that it can feed a roll-shaped recording medium F to the transport section 20. The feeding section 10 includes a roll medium holder 11, and the roll medium holder 11 holds the roll-shaped recording medium F. By rotating the roll-shaped recording medium F, the feeding section 10 feeds the recording medium F to the transport section 20, which is downstream in the delivery direction Y.

The transport section 20 transports the recording medium F, sent from the feeding section 10, to the recording section 30. The transport section 20 includes a first delivery roller 21 and is configured such that it can transport the recording medium F sent thereto to the recording section 30, which is further downstream in the delivery direction Y.

The recording section 30 includes an ink jet head R that ejects a treatment solution onto the recording medium F sent from the transport section 20, and ink jet heads H that eject inks.

The configuration of the ink jet heads is not limited to this; the configuration in FIG. 3, 5, or 6 described above is also allowable, but with the carriage being unnecessary and the ink jet head for treatment solution positioned the most upstream in the Y direction in FIG. 7.

The recording section 30, furthermore, includes a platen 34 as a recording medium support element that supports the recording medium from back at the time of the attachment of the solution and inks.

Downstream of the platen 34 in the delivery direction Y, there is a second delivery roller 43. The second delivery roller 43 is configured such that it can send the recording medium F after recording to the second drying section 50, which is downstream in the delivery direction Y.

In the vicinity of the outlet 64 of the second drying section 50, there is a third delivery roller 65. The third delivery roller 65 is installed to come into contact with the back surface of the recording medium F and is configured such that it can send the recording medium F to the ejection section 70, which is downstream in the delivery direction Y.

The ejection section 70 is provided such that it can send the recording medium F, sent from the second drying section 50, further downstream in the delivery direction Y and eject it to the outside of the ink jet recording apparatus 1. The ejection section 70 includes a fourth delivery roller 71, a fifth delivery roller 72, a sixth delivery roller 73, a seventh delivery roller 74, and a winding roller 75.

In the case of a line recording apparatus, as described above, recording is performed through a scan in which a treatment solution and inks are ejected from an ink jet head and attached to a recording medium F that is being fed and transported toward the ink jet head. In this manner, recording is performed through a scan that is a movement of the relative positions of the ink jet head and the recording medium. The attachment of the treatment solution and the attachment of the inks, furthermore, are performed in the same scan area during the same scan. Recording is performed in one scan.

With the recording apparatus according to this embodiment, an image with good graininess, coverage pinholes, and density unevenness can be formed because as a result of recording being performed by the recording method described above, a surfactant for which the surface tension of a 0.1% aqueous solution of the surfactant and the surface tension of a 0.1% propylene glycol solution of the surfactant are both 28.0 mN/m or less is used as a silicone surfactant employed in the treatment solution.

With this recording apparatus, furthermore, it can be ensured that the residual amounts of water and organic solvents in the treatment solution after its landing are appropriate because the duration from the landing of the solution droplet of the treatment solution on the recording medium to the landing of the ink droplet of the first ink composition on the recording medium is 0.15 seconds or more and 0.25 seconds or less, and the duration from the landing of the solution droplet of the treatment solution on the recording medium to the landing of the ink droplet of the second ink composition on the recording medium is 0.3 seconds or more and 0.6 seconds or less. As a result, good wettability and spreadability of ink droplets upon contact with droplets of the treatment solution can be achieved.

It should be noted that the recording method according to this embodiment can be performed with a serial recording apparatus like the example described above, and may also be performed with a line recording apparatus. It will be understood that in the case of a line recording apparatus, too, it is possible to set the duration from the landing of the solution droplet of the treatment solution on the recording medium to the landing of the ink droplet of the first ink composition on the recording medium to 0.15 seconds or more and 0.25 seconds or less and the duration from the landing of the solution droplet of the treatment solution on the recording medium to the landing of the ink droplet of the second ink composition on the recording medium to 0.3 seconds or more and 0.6 seconds or less as in the case of a serial recording apparatus, provided that an appropriate ink jet head configuration is selected.

3. TREATMENT SOLUTION

A treatment solution according to this embodiment is a treatment solution for use in the recording method described above and is a water-based treatment solution containing at least one coagulant. The treatment solution contains at least one silicone surfactant, and the silicone surfactant includes a silicone surfactant a, for which the surface tension of a 0.1% by mass aqueous solution of the surfactant is 28.0 mN/m or less and for which the surface tension of a 0.1% by mass propylene glycol solution of the surfactant is 28.0 mN/m or less.

With this treatment solution, good graininess, coverage pinholes, and density unevenness in the resulting image can be achieved because a surfactant for which the surface tension of a 0.1% aqueous solution of the surfactant and the surface tension of a 0.1% propylene glycol solution of the surfactant are both 28.0 mN/m or less is used as a silicone surfactant.

With this treatment solution, furthermore, it can be ensured that the residual amounts of water and organic solvents after landing on the recording medium are appropriate. As a result, good wettability and spreadability of ink droplets upon contact with droplets of the treatment solution can be achieved.

4. EXAMPLES AND COMPARATIVE EXAMPLES

Aspects of the present disclosure will now be specifically described using examples. No aspect of the present disclosure, however, is limited to these examples. In the following, "parts" and "%" are by mass unless stated otherwise. It should be noted that the evaluations were performed in an environment at a temperature of 25.0 °C and a relative humidity of 40.0% unless otherwise noted.

4.1. Preparation of Inks and Treatment Solutions

According to the formulae in Tables 1 and 2, the ingredients were placed in a container, mixed together, and stirred for 2 hours. Then the mixture was filtered using a 5.0-μm PTFE membrane filter. In this manner, treatment solutions (R1 to R16), first ink compositions (C1-1 and C1-2), and second ink compositions (C2-1 and C2-2) were obtained. The numerical values in the tables indicate percentages by mass. The water was purified water and was added to make the mass of each composition 100% by mass. For the pigments and the dispersant resins, the dispersions described later herein were prepared and used.

Of the ingredients presented in Tables 1 and 2, the ingredients not identified by a compound name were as follows.

Cationic polymer: "Catiomaster PD-7, a polyamine resin (epichlorohydrin-amine derivative resin)," manufactured by Yokkaichi Chemical Co., Ltd.

BYK-3420: A silicone surfactant (manufactured by BYK Japan KK), satisfying condition (a).

BYK-3480: A silicone surfactant (manufactured by BYK Japan KK), satisfying condition (a).

SAG002: SILFACE SAG002 (manufactured by Nissin Chemical Industry Co., Ltd.), not satisfying condition (a).

SAG503A: SILFACE SAG002 (manufactured by Nissin Chemical Industry Co., Ltd.), not satisfying condition (a).

SAG005: SILFACE SAG002 (manufactured by Nissin Chemical Industry Co., Ltd.), not satisfying condition (a).

BYK-333: A silicone surfactant (manufactured by BYK Japan KK), not satisfying condition (a).

BYK-348: A silicone surfactant (manufactured by BYK Japan KK), not satisfying condition (a).

BYK-349: A silicone surfactant (manufactured by BYK Japan KK), not satisfying condition (a).

1,2-HD: 1,2-Hexanediol.

2P: 2-Pyrrolidone.

Carbon black: No. 33 (manufactured by Mitsubishi Chemical Corporation)

Cyan pigment: C.I. Pigment Blue 15:3

Dispersion resins, resin A (anionic): An acrylic acid-acrylate copolymer (weight-average molecular weight, 25,000; acid value, 75)

Dispersion resins, resin B (nonionic): An acrylic acid-acrylate copolymer (weight-average molecular weight, 25,000; acid value, 30)

Resin particles, styrene-acrylic: See below (high aggregability)

Wax, polyethylene wax: "NOPCOTE PEM-17" (trade name; manufactured by San Nopco Ltd.)

Surfactant for inks: "BYK348" silicone surfactant, manufactured by BYK-Chemie GmbH Preparation of Resin Particles: Styrene-Acrylic A resin emulsion was obtained through emulsion copolymerization of styrene and an acrylic monomer. It should be noted that the surfactant for emulsion polymerization was Newcol NT-30 (manufactured by Nippon Nyukazai Co., Ltd.). Its amount was 1 part by mass, with the total amount of the monomers as 100 parts by mass.

Preparation of Pigment Dispersions

Pigment Dispersion with Resin A

First, 12 parts by mass of resin A as a resin dispersant was added to and dissolved in 155 parts by mass of deionized water in which 0.1 parts by mass of a 30% aqueous solution of ammonia (neutralizing agent) had been dissolved. Forty parts by mass of the pigment (C.I. Pigment Blue 15:3 or No. 33 carbon black) was added, and a dispersion treatment was performed for 10 hours using a ball mill with zirconia beads. Subsequently, centrifugal filtration using a centrifuge was performed to remove impurities, such as coarse particles and debris, and the colorant concentration was adjusted to make it 20% by mass. In this manner, a colorant dispersion was obtained.

Pigment Dispersion with Resin B

A colorant dispersion was obtained in the same manner except that resin B was used as the resin dispersant.

Silicone Surfactant Preparation Example 1

Preparation example 1, which was a silicone surfactant, was synthetically obtained, by performing synthesis as follows.

To a solution of 7.0 g of heptaethylene glycol monoallyl ether in 20 mL of tetrahydrofuran, 5.8 g of a dimethylpolysiloxane with 19 Si atoms having —H bonds at the Si atoms at both ends and 0.1 mL of chloroplatinic acid were added. By maintaining the mixture at 65 °C for 24 hours with stirring, reaction was induced. After the end of the reaction, the solvent was distilled away by rotary evaporation. In this manner, silicone surfactant preparation example 1 was obtained.

The structure of silicone surfactant preparation example 1 is as follows:

in formula (1), a=17;

x and y=3;

n and m=7;

o and p=0; and $R^1$ and $R^2$=hydroxy groups.

The measurement conditions for the GPC measurement of each silicone surfactant were as follows.

Measurement Conditions

Solvent: Tetrahydrofuran

Columns: TSKgel SuperHZM-N×2 +TSKgel guardcolumn SuperHZ-L

Column temperature: 40 °C

Injection volume: 25 μL

Detector: Refractive index (RI)

Flow rate: 0.35 mL/min

Calibration curve: A calibration curve constructed using 13 samples of STKstandard Polystyrene (manufactured by Tosoh Corporation) standard polystyrene, Mw=1000000 to 500, was used.

For each silicone surfactant, a 0.1% by mass aqueous solution of the surfactant and a 0.1% by mass propylene glycol solution of the surfactant were prepared, and their surface tension was measured as described above. The measurements for each silicone surfactant are summarized in Table 6.

It should be noted that in each table, whether or not the silicone surfactant in the treatment solution satisfies condition (a), i.e., the surface tension of a 0.1% aqueous solution of the surfactant being 28.0 mN/m or less, and the surface tension of a 0.1% propylene glycol solution of the surfactant being 28.0 mN/m or less, is indicated as "Y" if the condition is satisfied, or "N" if the condition is not satisfied.

4.2. Evaluation Methods 4.2.1. Thickening Factor

The "viscosity increase when mixed at a 10:1 ratio by mass (ink:7% by mass aqueous solution of calcium formate)" presented in Table 2 is the ratio of the viscosity of a mixture of the ink to the viscosity of the ink alone as determined by mixing the ink and a 7% by mass aqueous solution of calcium formate at a ratio by mass of 10:1, stirring the mixture for 1 minute, and then measuring its viscosity using MCR302 rheometer (manufactured by Anton Paar GmbH) under the conditions of 25 °C and a shear rate of 200 s-1. The results are presented in Table 2.

4.2.2. Recording Test

A modified version of SurePress L-4733A digital label press was loaded with the inks and treatment solution of each example or comparative example. The recording apparatus was as illustrated in FIG. 4, and the ink jet head configuration was as illustrated in FIG. 6. The number of ink jet heads, however, was five.

The recording resolution was basically 1200×1200 dpi, and the number of droplets per pixel was adjusted so that the attachment densities of the compositions would be the values in Tables 3 to 5. The temperature for primary heating is presented in the tables as "recording medium surface temperature." Secondary heating was performed by heating to 70 °C using a secondary heater provided downstream of the head. The recording medium was PET50A (manufactured by LINTEC Corporation). Each test was performed under the conditions specified in Tables 3 to 5. As "treatment solution-to-ink time lags [s]," the duration from the landing of the solution droplets of the treatment solution on the recording medium to the landing of the ink droplets of the first ink on the recording medium and the duration from the landing of the solution droplets of the treatment solution on the recording medium to the landing of the ink droplets of the second ink composition on the recording medium are presented in Tables 3 to 5. Weights per ejected droplet are presented in the tables.

An ink jet head at one end was loaded with the treatment solution, the ink jet head closest to the ink jet head for treatment solution was loaded with the first ink, and the ink jet head at the other end was loaded with the second ink.

In Example 1, the nozzle-to-nozzle distance between the ink jet head for treatment solution and the ink jet head for the first ink was 150 mm, and the nozzle-to-nozzle distance between the ink jet head for treatment solution and the ink jet head for the second ink was 338 mm. In the examples and comparative examples in which the treatment solution-to-ink time lags differed, the positions of the ink jet heads for ink in the X direction were changed.

By performing recording through a scan in which the carriage was moved in the direction of the ink jet head for treatment solution, an image was recorded in one pass. The scan speed was 750 mm/second.

4.2.3. Evaluation of Coverage and Pinholes in the Image

A test pattern in which the compositions were attached in layers was recorded, with the attachment densities set as follows: treatment solution, 1.5 mg/inch$^2$; first ink, 3.5 mg/inch$^2$; second ink, 3.5 mg/inch$^2$. The solid image area of the resulting recorded article was visually observed under fluorescent lighting and evaluated using the following criteria.

A: No uncovered areas or pinholes are present.

B: Some uncovered areas or pinholes are visible.

C: A significant number of uncovered areas or pinholes are visible.

4.2.4. Evaluation of the Graininess of the Image

A test pattern in which the compositions were attached in layers was recorded, with the attachment densities set as follows: treatment solution, 1.5 mg/inch$^2$; first ink, 1.8 mg/inch$^2$; second ink, 1.8 mg/inch$^2$. The image area of the resulting recorded article was visually observed under fluorescent lighting and evaluated using the following criteria.

A: No graininess of dots is present.

B: Slight graininess of dots is visible.

C: Significant graininess of dots is visible.

4.2.5. Evaluation of Density Unevenness in the Image

A test pattern in which the compositions were attached in layers was recorded, with the attachment densities set as follows: treatment solution, 1.5 mg/inch$^2$; first ink, 4.5 mg/inch$^2$; second ink, 4.5 mg/inch$^2$. The solid image area of the resulting recorded article was visually observed under fluorescent lighting and evaluated using the following criteria.

A: No density unevenness is present.

B: Slight density unevenness is visible.

C: Significant density unevenness is visible.

It should be noted that as used herein, density unevenness in an image refers to a defect known as aggregation unevenness, bleed-related unevenness, etc., in which the gathering of ink droplets on the recording medium causes unevenness. Density unevenness in an image varies primarily depending on the degrees of aggregation, reaction with the treatment solution, and drying of ink droplets.

4.2.6. Evaluation of the Abrasion Resistance of the Image

A test pattern was printed by attaching the compositions in layers, with the attachment densities set as follows: treatment solution, 3 mg/inch$^2$; first ink, 4 mg/inch$^2$; second ink, 4 mg/inch$^2$; the total attachment density of the treatment solution and inks, 11 mg/inch$^2$. After 2 minutes of drying in a 70 °C environment as secondary heating, the following evaluation was performed. The portion coated with the inks was cut into a 30×150 mm rectangle, and this specimen was rubbed 50 times with a water-damped piece of plain-woven fabric using a colorfastness rubbing tester (load, 500 g). The degree of ink detachment was visually observed and evaluated according to the evaluation criteria below.

A: In the colorfastness rubbing test, no detachment occurs after 10 rubs with a load of 500 g.

B: In the colorfastness rubbing test, detachment occurs after 10 rubs with a load of 500 g, but the area of detachment constitutes 10% or less in relation to the test area.

C: In the colorfastness rubbing test, detachment of 10% or greater occurs after 10 rubs with a load of 500 g.

4.3. Evaluation Results

It was found that with the recording methods of the Examples, in which the duration from the landing of the solution droplets of the treatment solution on the recording medium to the landing of the ink droplets of the first ink on the recording medium was 0.15 seconds or more and less than 0.25, the duration from the landing of the solution droplets of the treatment solution on the recording medium to the landing of the ink droplets of the second ink on the recording medium was more than 0.3 seconds and 0.6 seconds or less, and the treatment solution contained a silicone surfactant satisfying condition (a), good graininess, coverage pinholes, and density unevenness in the resulting image can be achieved.

It should be noted that although not presented in the tables, evaluations were performed under the same conditions with the recording apparatus changed to a line recording apparatus as illustrated in FIG. 7. The evaluation results were similar, indicating that the same can be achieved even with a line recording apparatus.

In addition, a yellow ink, in which the colorant in the first ink was replaced with P.Y. 150, and a magenta ink, in which the colorant was replaced with P.R. 120, were prepared and introduced into ink jet heads other than those for the treatment solution, first ink, and second ink. Recording was performed with the four inks, with the attachment densities of the inks equalized so that the total attachment density of inks would be the same as in each example. The evaluation results were similar, indicating that the same can be achieved even with three or more inks.

Meanwhile, when recording was attempted using SC-R5050 or SC-S80650 (both manufactured by Seiko Epson Corporation) as the recording apparatus, the length of the carriage in the scanning direction was small, preventing the same ink jet head configuration as described above from being achieved.

The present disclosure embraces configurations substantially identical to those described in the embodiments, such as configurations identical in function, methodology, and results to or having the same goal and offering the same advantages as the described ones. The present disclosure also includes configurations created by changing any nonessential part of those described in the embodiments. The present disclosure, furthermore, encompasses configurations identical in operation and effect to or capable of fulfilling the same purposes as those described in the embodiments. Configurations obtained by adding a known technology to those described in the embodiments are also part of the present disclosure.

From the embodiments and variations described above, the following is derived.

A recording method includes:

a treatment solution attachment step, in which a treatment solution is ejected from an ink jet head and attached to a recording medium;

a first ink attachment step, in which a first ink composition is ejected from the ink jet head and attached to the recording medium; and a second ink attachment step, in which a second ink composition is ejected from the ink jet head and attached to the recording medium, wherein:

the treatment solution is a water-based treatment solution containing at least one coagulant;

the first ink composition and the second ink composition are water-based ink compositions each containing at least one colorant;

the treatment solution, the first ink composition, and the second ink composition are attached to the recording medium through a scan in which the relative positions of the ink jet head and the recording medium are moved, the solution and compositions being attached to the same scan area during the same scan;

the duration from the landing of the solution droplet of the treatment solution on the recording medium to the landing of the ink droplet of the first ink composition on the recording medium is 0.15 seconds or more and 0.25 seconds or less;

the duration from the landing of the solution droplet of the treatment solution on the recording medium to the landing of the ink droplet of the second ink composition on the recording medium is 0.3 seconds or more and 0.6 seconds or less;

the treatment solution contains at least one silicone surfactant;

the silicone surfactant includes a silicone surfactant a; and the silicone surfactant a is a silicone surfactant for which the surface tension of a 0.1% by mass aqueous solution of the surfactant is 28.0 mN/m or less and for which the surface tension of a 0.1% by mass propylene glycol solution of the surfactant is 28.0 mN/m or less.

With this recording method, good graininess, coverage pinholes, and density unevenness in the resulting image can be achieved by virtue of the use of a surfactant for which the surface tension of a 0.1% aqueous solution of the surfactant and the surface tension of a 0.1% propylene glycol solution of the surfactant are both 28.0 mN/m or less as a silicone surfactant used in the treatment solution.

With this recording method, furthermore, it can be ensured that the residual amounts of water and organic solvents in the treatment solution after its landing are appropriate because the duration from the landing of the solution droplet of the treatment solution on the recording medium to the landing of the ink droplet of the first ink composition on the recording medium is 0.15 seconds or more and 0.25 seconds or less, and the duration from the landing of the solution droplet of the treatment solution on the recording medium to the landing of the ink droplet of the second ink composition on the recording medium is 0.3 seconds or more and 0.6 seconds or less. As a result, good wettability and spreadability of ink droplets upon contact with droplets of the treatment solution can be achieved.

The wettability and spreadability of ink droplets upon contact with droplets of a treatment solution appear to be associated with the surface tension of the treatment solution at the time of contact with the ink droplets. In this recording method, a surfactant for which the surface tension of a 0.1% aqueous solution of the surfactant and the surface tension of a 0.1% propylene glycol solution of the surfactant are both 28.0 mN/m or less is used, which ensures that ink droplets coming into contact with the treatment solution at a time shortly after its landing and ink droplets coming into contact with the treatment solution at a time late after its landing have similar levels of wettability and spreadability. Presumably because of this, superior graininess, coverage pinholes, and density unevenness in the resulting image can be achieved.

In the above recording method, the amount of the silicone surfactant a in the treatment solution may be 0.1% by mass or more and 1.5% by mass or less.

With this recording method, better graininess and coverage pinholes in the resulting image, as well as abrasion resistance, can be achieved.

In the above recording method, for each of the first ink composition and the second ink composition, the viscosity increase when mixed with a 7% by mass aqueous solution of calcium formate at a ratio by mass (the ink composition to the aqueous solution) of 10:1 may be fivefold or greater.

With this recording method, better density unevenness in the resulting image can be achieved.

In the above recording method, the mass of the solution droplet of the treatment solution may be 1 ng or more and 7.0 ng or less.

With this recording method, better density unevenness in the resulting image can be achieved.

In the above recording method, the surface temperature of the recording medium in the treatment solution attachment step, the first ink attachment step, and the second ink attachment step may be 45 °C or below.

With this recording method, better graininess in the resulting image can be achieved.

In the above recording method, the silicone surfactant a may be a silicone surfactant for which in the molecular weight distribution obtained by gel permeation chromatography, the largest peak at molecular weights of 300 or greater is within the molecular weight range of 1000 to 3000.

With this recording method, better abrasion resistance of the resulting image can be achieved.

In the above recording method, the time lag between the landing of the droplet of the first ink composition on the recording medium and the landing of the second ink droplet on the recording medium may be 0.1 seconds or more and 0.5 seconds or less.

With this recording method, better graininess and coverage pinholes in the resulting image, as well as abrasion resistance, can be achieved.

In the above recording method, the treatment solution may contain an organic solvent that is a polyol having a normal boiling point of 170 °C or above and 240 °C or below.

With this recording method, better graininess and abrasion resistance of the resulting image can be achieved.

In the above recording method, the treatment solution may be configured not to contain a nitrogen-containing solvent in an amount exceeding 5% by mass.

With this recording method, better graininess and abrasion resistance of the resulting image can be achieved.

A recording apparatus is:

a recording apparatus that performs the recording method described above, the recording apparatus including: the treatment solution, the first ink composition, and the second ink composition; and an ink jet head that ejects the treatment solution, the first ink composition, and the second ink composition.

With this recording apparatus, good graininess, coverage pinholes, and density unevenness in the resulting image can be achieved by virtue of the use of a surfactant for which the surface tension of a 0.1% aqueous solution of the surfactant and the surface tension of a 0.1% propylene glycol solution of the surfactant are both 28.0 mN/m or less as a silicone surfactant used in the treatment solution.

With this recording apparatus, furthermore, it can be ensured that the residual amounts of water and organic solvents in the treatment solution after its landing are appropriate because the duration from the landing of the solution droplet of the treatment solution on the recording medium to the landing of the ink droplet of the first ink composition on the recording medium is 0.15 seconds or more and 0.25 seconds or less, and the duration from the landing of the solution droplet of the treatment solution on the recording medium to the landing of the ink droplet of the second ink composition on the recording medium is 0.3 seconds or more and 0.6 seconds or less. As a result, good wettability and spreadability of ink droplets upon contact with droplets of the treatment solution can be achieved.

An ink set is:

for use in the recording method described above, the ink set including:

the treatment solution, the first ink composition, and the second ink composition.

With this ink set, good graininess, coverage pinholes, and density unevenness in the image formed by the ink compositions can be achieved by virtue of the treatment solution containing, as a silicone surfactant, a surfactant for which the surface tension of a 0.1% aqueous solution of the surfactant and the surface tension of a 0.1% propylene glycol solution of the surfactant are both 28.0 mN/m or less.

With this ink set, furthermore, it can be ensured that the residual amounts of water and organic solvents after landing on the recording medium are appropriate. As a result, good wettability and spreadability of ink droplets upon contact with droplets of the treatment solution can be achieved.

A treatment solution is:

a treatment solution for use in the recording method described above and is:

a water-based treatment solution containing at least one coagulant, wherein:

the treatment solution contains at least one silicone surfactant, and;

the silicone surfactant includes a silicone surfactant a, for which the surface tension of a 0.1% by mass aqueous solution of the surfactant is 28.0 mN/m or less and for which the surface tension of a 0.1% by mass propylene glycol solution of the surfactant is 28.0 mN/m or less.

With this treatment solution, good graininess, coverage pinholes, and density unevenness in the resulting image can be achieved because a surfactant for which the surface tension of a 0.1% aqueous solution of the surfactant and the surface tension of a 0.1% propylene glycol solution of the surfactant are both 28.0 mN/m or less is used as a silicone surfactant.

With this treatment solution, furthermore, it can be ensured that the residual amounts of water and organic solvents after landing on the recording medium are appropriate. As a result, good wettability and spreadability of ink droplets upon contact with droplets of the treatment solution can be achieved.

What is claimed is:

1. A recording method comprising:

a treatment solution attachment step, in which a treatment solution is ejected from an ink jet head and attached to a recording medium;

a first ink attachment step, in which a first ink composition is ejected from the ink jet head and attached to the recording medium; and a second ink attachment step, in which a second ink composition is ejected from the ink jet head and attached to the recording medium, wherein:

the treatment solution is a water-based treatment solution containing at least one coagulant;

the first ink composition and the second ink composition are water-based ink compositions each containing at least one colorant;

the treatment solution, the first ink composition, and the second ink composition are attached to the recording medium through a scan in which relative positions of the ink jet head and the recording medium are moved, the solution and compositions being attached to the same scan area during the same scan;

a duration from landing of a solution droplet of the treatment solution on the recording medium to landing of an ink droplet of the first ink composition on the recording medium is 0.15 seconds or more and 0.25 seconds or less;

a duration from the landing of the solution droplet of the treatment solution on the recording medium to landing of an ink droplet of the second ink composition on the recording medium is 0.3 seconds or more and 0.6 seconds or less;

the treatment solution contains at least one silicone surfactant;

the silicone surfactant includes a silicone surfactant a; and the silicone surfactant a is a silicone surfactant for which a surface tension of a 0.1% by mass aqueous solution of the surfactant is 28.0 mN/m or less and for which a surface tension of a 0.1% by mass propylene glycol solution of the surfactant is 28.0 mN/m or less.

2. The recording method according to claim 1, wherein:

an amount of the silicone surfactant a in the treatment solution is 0.1% by mass or more and 1.5% by mass or less.

3. The recording method according to claim 1, wherein:

for each of the first ink composition and the second ink composition, a viscosity increase when mixed with a 7% by mass aqueous solution of calcium formate at a ratio by mass, the ink composition to the aqueous solution, of 10:1 is fivefold or greater.

4. The recording method according to claim 1, wherein:

a mass of the solution droplet of the treatment solution is 1 ng or more and 7.0 ng or less.

5. The recording method according to claim 1, wherein:

a surface temperature of the recording medium in the treatment solution attachment step, the first ink attachment step, and the second ink attachment step is 45 °C or below.

6. The recording method according to claim 1, wherein:

the silicone surfactant a is a silicone surfactant for which in a molecular weight distribution obtained by gel permeation chromatography, a largest peak at molecular weights of 300 or greater is within a molecular weight range of 1500 to 4500.

7. The recording method according to claim 1, wherein:

a time lag between the landing of the droplet of the first ink composition on the recording medium and the landing of the second ink droplet on the recording medium is 0.1 seconds or more and 0.5 seconds or less.

8. The recording method according to claim 1, wherein:

the treatment solution contains an organic solvent that is a polyol having a normal boiling point of 170 °C or above and 240 °C or below.

9. The recording method according to claim 1, wherein:

the treatment solution does not contain a nitrogen-containing solvent in an amount exceeding 5% by mass.

10. A recording apparatus that performs the recording method according to claim 1, the recording apparatus comprising:

the treatment solution, the first ink composition, and the second ink composition; and an ink jet head that ejects the treatment solution, the first ink composition, and the second ink composition.

11. An ink set for use in the recording method according to claim 1, the ink set comprising:

the treatment solution, the first ink composition, and the second ink composition.

* * * * *